United States Patent
Newell et al.

(10) Patent No.: US 10,740,081 B2
(45) Date of Patent: Aug. 11, 2020

(54) METHODS AND APPARATUS FOR SOFTWARE LIFECYCLE MANAGEMENT OF A VIRTUAL COMPUTING ENVIRONMENT

(71) Applicant: VMware, Inc., Palo Alto, CA (US)

(72) Inventors: Don Newell, Cupertino, CA (US); Atanu Panda, San Jose, CA (US); Mallika Kamat, Mountain View, CA (US); Rohan Sen, Bangalore (IN); Sudipto Mukhopadhyay, Pleasanton, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/187,480

(22) Filed: Jun. 20, 2016

(65) Prior Publication Data
US 2017/0003951 A1 Jan. 5, 2017

(30) Foreign Application Priority Data
Jun. 30, 2015 (IN) .......................... 3344/CHE/2015

(51) Int. Cl.
*G06F 9/44* (2018.01)
*G06F 8/65* (2018.01)
(Continued)

(52) U.S. Cl.
CPC .................. *G06F 8/65* (2013.01); *G06F 8/60* (2013.01); *G06F 8/61* (2013.01); *G06F 8/656* (2018.02);
(Continued)

(58) Field of Classification Search
CPC ...... G06F 8/65; G06F 9/45558; G06F 9/5088; H04L 67/10
(Continued)

(56) References Cited

U.S. PATENT DOCUMENTS 7,389,300 B1  6/2008  Shah et al.
7,574,491 B2  8/2009  Stein et al.
(Continued)

FOREIGN PATENT DOCUMENTS

EP       1521172     4/2005

OTHER PUBLICATIONS

VirtualRack, "virtualRack", accessed on Jun. 26, 2014, http://www.virtualrack.in/, (1 page).
(Continued)

*Primary Examiner* — Qamrun Nahar
(74) *Attorney, Agent, or Firm* — Hanley, Flight & Zimmerman, LLC

(57) ABSTRACT

Methods and apparatus for software lifecycle management of a virtual computing environment. An example method includes determining if sufficient computing resources for installing the software are available in a virtual environment in the virtual rack system, when sufficient computing resources are not available in the virtual environment, identifying a spare computing resource that is available for use during installation of the software, adding the spare computing resource to the virtual environment, migrating a workload that is executing on a current computing resource to the spare computing resource, and installing the software on the current computing resource.

21 Claims, 11 Drawing Sheets

(51) Int. Cl.
  *G06F 9/50* (2006.01)
  *G06F 9/455* (2018.01)
  *G06F 8/61* (2018.01)
  *G06F 8/656* (2018.01)
  *G06F 8/70* (2018.01)
  *G06F 8/60* (2018.01)
  *H04L 29/08* (2006.01)

(52) U.S. Cl.
  CPC ............ *G06F 8/70* (2013.01); *G06F 9/45558* (2013.01); *G06F 9/5088* (2013.01); *G06F 2009/4557* (2013.01); *H04L 67/1031* (2013.01)

(58) Field of Classification Search
  USPC .......................................................... 717/171
  See application file for complete search history.

(56) References Cited

U.S. PATENT DOCUMENTS

| | | | |
|---|---|---|---|
| 8,171,485 | B2 | 5/2012 | Muller |
| 8,689,054 | B1 | 4/2014 | van der Goot |
| 8,997,098 | B2 | 3/2015 | Lee et al. |
| 9,176,764 | B1 | 11/2015 | Jorgensen |
| 9,383,988 | B2 | 7/2016 | Rychikhin |
| 9,830,142 | B2 | 11/2017 | Thomas et al. |
| 2001/0029605 | A1 | 10/2001 | Forbes et al. |
| 2003/0204603 | A1 | 10/2003 | Buchannan et al. |
| 2004/0187103 | A1 | 9/2004 | Wickham et al. |
| 2005/0027843 | A1* | 2/2005 | Bozak ........................ G06F 8/61 709/223 |
| 2005/0044220 | A1 | 2/2005 | Madhavan |
| 2006/0156041 | A1 | 7/2006 | Zaretsky et al. |
| 2006/0184349 | A1 | 8/2006 | Goud et al. |
| 2007/0027973 | A1 | 2/2007 | Stein et al. |
| 2008/0201705 | A1 | 8/2008 | Wookey |
| 2009/0249284 | A1 | 10/2009 | Antosz et al. |
| 2009/0249354 | A1 | 10/2009 | Yamaguchi et al. |
| 2009/0290501 | A1 | 11/2009 | Levy et al. |
| 2009/0328030 | A1 | 12/2009 | Fries |
| 2010/0042723 | A1 | 2/2010 | Sundarrajan et al. |
| 2010/0070784 | A1 | 3/2010 | Gupta et al. |
| 2010/0106813 | A1 | 4/2010 | Voutilainen et al. |
| 2010/0114826 | A1 | 5/2010 | Voutilainen et al. |
| 2010/0235688 | A1 | 9/2010 | Bennah et al. |
| 2011/0029669 | A1 | 2/2011 | Chuang et al. |
| 2011/0153697 | A1 | 6/2011 | Nickolov et al. |
| 2012/0166390 | A1 | 6/2012 | Merriman et al. |
| 2012/0179466 | A1 | 7/2012 | Huang et al. |
| 2012/0249588 | A1 | 10/2012 | Tison et al. |
| 2012/0266166 | A1 | 10/2012 | Farkas et al. |
| 2012/0303767 | A1 | 11/2012 | Renzin |
| 2013/0054734 | A1 | 2/2013 | Bond et al. |
| 2013/0151681 | A1* | 6/2013 | Dournov ................ G06F 8/656 709/223 |
| 2014/0013318 | A1 | 1/2014 | Rychikhin |
| 2014/0075179 | A1 | 3/2014 | Krishnapura et al. |
| 2014/0082202 | A1 | 3/2014 | Zhao |
| 2014/0129699 | A1 | 5/2014 | Jeftovic et al. |
| 2014/0156850 | A1 | 6/2014 | Hunt |
| 2014/0173580 | A1 | 6/2014 | McDonald et al. |
| 2014/0181294 | A1 | 6/2014 | Deshpande et al. |
| 2014/0280975 | A1 | 9/2014 | Mordani et al. |
| 2014/0282519 | A1* | 9/2014 | Apte .................... G06F 9/45533 718/1 |
| 2014/0282520 | A1 | 9/2014 | Sabharwal |
| 2014/0297834 | A1 | 10/2014 | Tripathi et al. |
| 2014/0351809 | A1 | 11/2014 | Chawla et al. |
| 2014/0380308 | A1 | 12/2014 | Hassine et al. |
| 2015/0046572 | A1 | 2/2015 | Cheng et al. |
| 2015/0059006 | A1 | 2/2015 | White |
| 2015/0082296 | A1 | 3/2015 | Thomas et al. |
| 2015/0089496 | A1 | 3/2015 | Thankappan et al. |
| 2015/0113529 | A1 | 4/2015 | Zhong |
| 2015/0143380 | A1 | 5/2015 | Chen et al. |
| 2015/0143382 | A1* | 5/2015 | Chen ...................... G06F 9/5005 718/104 |
| 2015/0149620 | A1 | 5/2015 | Banerjee et al. |
| 2015/0154056 | A1* | 6/2015 | Chen ...................... G06F 9/4856 718/103 |
| 2015/0207752 | A1 | 7/2015 | Birkestrand et al. |
| 2015/0261578 | A1 | 9/2015 | Greden et al. |
| 2015/0286935 | A1 | 10/2015 | Mukherjee et al. |
| 2015/0317173 | A1* | 11/2015 | Anglin ................ G06F 9/45558 718/1 |
| 2015/0378765 | A1 | 12/2015 | Singh et al. |
| 2016/0004696 | A1 | 1/2016 | Trenkov et al. |
| 2016/0179184 | A1* | 6/2016 | Shah ...................... G06F 1/3296 713/320 |
| 2016/0191343 | A1 | 6/2016 | Dong et al. |
| 2016/0283221 | A1* | 9/2016 | Kochar ............... G06F 9/45558 |
| 2016/0371105 | A1* | 12/2016 | Sieffert ............... G06F 9/45545 |

OTHER PUBLICATIONS

VirtualRack, "Why VirtualRack", accessed on Jun. 26, 2014, http://www.virtualrack.in/why-virtualrack.php, (2 pages).
VirtualRack, "VirtualRack Overview", accessed on Jun. 26, 2014, http://www.virtualrack.in/overview.php, (1 page).
VirtualRack, "Questions", accessed on Jun. 26, 2014, http://www.virtualrack.in/questions.php, (3 pages).
Intel Hewlett-Packard NEC Dell, "IPMI—Intelligent Platform Magagement Interface Specification Second Generation v2.0", Feb. 12, 2004, http://www.intel.com/content/dam/www/public/us/en/documents/product-briefs/second-gen-interface-spec-v2-rev1-4.pdf, (590 pages).
VMware, "Using the CIM Object Space", accessed on Jun. 20, 2016, http://pubs.vmware.com/vsphere-55/index.jsp?topic=%2Fcom.vmware.cimsdk.smashpg.doc%2F03_CIM_SMASH_PG_Use_Cases.5.1.html, (48 pages).
Cisco, "Cisco UCS Manager", accessed on Jun. 20, 2016, http://www.cisco.com/c/en/us/products/servers-unified-computing/ucs-manager/index.html, (3 pages).
Cisco, "Servers—Unified Computing", accessed on Jun. 20, 2016, http://www.cisco.com/c/en/us/products/servers-unified-computing/index.html, (2 pages).
Cisco, "Cisco UCS C-Series Servers Integrated Management Controller CLI Configuration Guide, Release 1.3", Oct. 17, 2011, http://www.cisco.com/c/en/us/td/docs/unified_computing/ucs/c/sw/cli/config/guide/131/b_Cisco_UCS_C-Series_CLI_Configuration_Guide_131.pdf, (150 pages).
Cisco, "Cisco UCS Faults and Error Messages Reference", accessed on Jun. 20, 2016, http://www.cisco.com/c/en/us/td/docs/unified_computing/ucs/ts/faults/reference/ErrMess/UCS_SEMs.html, (119 pages).
Cisco, "Cisco UCS Manager Troubleshooting Reference Guide", accessed on Jun. 20, 2016, http://www.cisco.com/c/en/us/td/docs/unified_computing/ucs/ts/guide/UCSTroubleshooting/UCSTroubleshooting_chapter_0111.html, (18 pages).
VMware, "Common Information Model ("CIM") Provider for vSphere", accessed on Jun. 20, 2016, https://vdc-download.vmware.com/vmwb-repository/dcr-public/2849eab6-3508-4352-8e96-5078f9f83ed0/78aa69e9-2a0d-46b3-bcb5-4c6a9e2836d2/CIM%20Provider%20for%20vSphere%20Program%20Guide%20Sept2015.pdf, (33 pages).
VMware, "VMware Introduces VMware vSphere with Operations Management and VMware vSphere Data Protection Advanced", Feb. 12, 2013, http://www.vmware.com/company/news/releases/vmw-vsom-vdap-021213, (5 pages).
VMware, "VMware vSphere with Operations Management", accessed on Jun. 20, 2016, http://www.vmware.com/files/pdf/products/vsphere/VMware-vSphere-with-Operations-Management-Datasheet.pdf, (4 pages).
The International Searching Authority, "Invitation to Pay Additional Fees," issued in connection with application No. PCT/US2016/040205, dated Oct. 20, 2016, 6 pages.
The International Searching Authority, "International Search Report and Written Opinion," issued in connection with application No. PCT/US2016/040205, dated Dec. 15, 2016, 19 pages.

(56) References Cited

OTHER PUBLICATIONS

United States Patent and Trademark Office, "Non-Final Office Action," issued in connection with U.S. Appl. No. 14/788,004, dated Jun. 5, 2017, 32 pages.
United States Patent and Trademark Office, "Final Office Action," issued in connection with U.S. Appl. No. 14/796,803, dated May 22, 2017, 22 pages.
United States Patent and Trademark Office, "Non-Final Office Action," issued in connection with U.S. Appl. No. 14/796,803, dated Feb. 22, 2017, 42 pages.
Pham et al., "An Evaluation of ZooKeeper for High Availability in System S," ICPE '14, Mar. 22, 2014, 11 pages.
VMware Infrastructure, "Resource Management with VMware DRS," copyright 1998-2006, VMware Inc., Palo Alto, California, 24 pages. (The latest year of publication is sufficiently earlier than the effective U.S. filing date so that the particular month of publication is not in issue.).
United States Patent and Trademark Office, "Non-Final Office Action," issued in connection with U.S. Appl. No. 14/788,210, dated Jun. 30, 2015, 54 pages.
VirtualRack, An Inter Pole Enterprise, copyright 2009, http://www.virtualrack.in/, 1 page. (The year of publication is sufficiently earlier than the effective U.S. filing date so that the particular month of publication is not in issue.).
VirtualRack, "VirtualRack Overview," An Inter Pole Enterprise, copyright 2009, http://www.virtualrack.in/overview.php, 1 page. (The year of publication is sufficiently earlier than the effective U.S. filing date so that the particular month of publication is not in issue.).
VirtualRack, "Questions," An Inter Pole Enterprise, copyright 2009, http://www.virtualrack.in/questions.php, 3 pages. (The year of publication is sufficiently earlier than the effective U.S. filing date so that the particular month of publication is not in issue.).
VirtualRack, "Why VirtualRack?," An Inter Pole Enterprise, copyright 2009, http://www.virtualrack.in/why-virtualrack.php, 2 pages. (The year of publication is sufficiently earlier than the effective U.S. filing date so that the particular month of publication is not in issue.).
VMware, "Using the CIM Object Space," http://pubs.vmware.com/vsphere-55/index.jsp?topic=%2Fcom.vmware.cimsdk.smashpg.doc%2F03_CIM_SMASH_PG_Use_Cases.5.1.html, retrieved on Aug. 31, 2016, 1 page.
Cisco, "Proven Savings in IT Operations," http://www.cisco.com/c/en/us/products/servers-unified-computing/ucs-manager/index.html, retrieved on Aug. 31, 2016, 2 pages.
Cisco, "Servers—Unified Computing," http://www.cisco.com/c/en/us/products/servers-unitied-computing/index.html, retrieved on Aug. 31, 2016, 3 pages.
Cisco, "Cisco UCS Faults and Error Messages Reference," http://www.cisco.com/c/en/us/td/docs/unified_computing/ucs/ts/faults/reference/ErrMess/UCS_SEMs.html, retrieved on Aug. 31, 2016, 125 pages.
Cisco, "Cisco UCS Manager Troubleshooting Reference Guide," Chapter: Troubleshooting Server Hardware Issues, http://www.cisco.com/c/en/us/td/docs/unified_computing/ucs/ts/guide/UCSTroubleshooting/UCSTroubleshooting_chapter_0111.html, retrieved on Aug. 31, 2016, 20 pages.
Cisco, "Cisco UCS C-Series Servers Integrated Management Controller CLI Configuration Guide, Release 1.3," http://www.cisco.com/c/en/us/td/docs/unified_computing/ucs/c/sw/cli/config/guide/131/b_Cisco_UCS_C-Series_CLI_Configuration_Guide_131.pdf, Mar. 11, 2011, 150 pages.
Intel, "IPMI, Intelligent Platform Management Interface Specification Second Generation V2.0," Feb. 12, 2004, http://www.intel.com/CONTENT/WWW/US/EN/SERVERS/IPMI/SECOND-GEN-INTERFACE-SPEC-V2-REV1-4.HTML, 590 pages.
United States Patent and Trademark Office, "Non-Final Office Action," issued in connection with U.S. Appl. No. 14/752,699, dated Aug. 29, 2017, 35 pages.
United States Patent and Trademark Office, "Non-Final Office Action," issued in connection with U.S. Appl. No. 14/788,193 dated Sep. 25, 2017, 38 pages.
United States Patent and Trademark Office, "Non-Final Office Action," issued in connection with U.S. Appl. No. 14/796,826 dated Oct. 13, 2017, 46 pages.
United States Patent and Trademark Office, "Notice of Allowance," issued in connection with U.S. Appl. No. 14/796,803 dated Sep. 12, 2017, 45 pages.
United States Patent and Trademark Office, "Non-Final Office Action," issued in connection with U.S. Appl. No. 15/187,452, dated Aug. 30, 2017, 30 pages.
United States Patent and Trademark Office, "Notice of Allowance," issued in connection with U.S. Appl. No. 14/796,826, dated May 15, 2018, 15 pages.
United States Patent and Trademark Office, "Notice of Allowance," issued in connection with U.S. Appl. No. 14/752,699, dated Mar. 27, 2018, 9 pages.
United States Patent and Trademark Office, "Notice of Allowance," issued in connection with U.S. Appl. No. 14/788,193, dated Mar. 22, 2018, 13 pages.
United States Patent and Trademark Office, "Final Office Action," issued in connection with U.S. Appl. No. 15/187,452, dated Apr. 4, 2018, 19 pages.
United States Patent and Trademark Office, "Notice of Allowance," issued in connection with U.S. Appl. No. 14/788,004, dated Apr. 9, 2018, 8 pages.
European Patent Office, "First Examination Report", issued in connection with European application No. 16739341.2, dated Oct. 23, 2018 (10 pages).
United States Patent and Trademark Office, "Non-Final Office Action," issued in connection with U.S. Appl. No. 15/187,452, dated Nov. 9, 2018, 28 pages.
Dayal, Umeshwar et al., "Workflow Technologies Meet the Internet," Workflow Management Systems and Interoperability, pp. 423-438, Aug. 12, 1997, https://link.springer.com/chapter/10.1007%2F978-3-642-58908-9_19?LI=true, 2 pages.
European Patent Office, "Communication pursuant to Article 94(3) EPC", issued in connection with application No. 16739341.2 dated May 23, 2019, 8 pages.
United States Patent and Trademark Office, "Final Office Action," issued in connection with U.S. Appl. No. 15/187,452 dated May 30, 2019, 21 pages.
United States Patent and Trademark Office, "Advisory Action," issued in connection with U.S. Appl. No. 15/187,452 dated Sep. 3, 2019, 4 pages.
United States Patent and Trademark Office, "Notice of Allowance," issued in connection with U.S. Appl. No. 15/187,452 dated Nov. 18, 2019, 5 pages.
United States Patent and Trademark Office, "Corrected Notice of Allowance," issued in connection with U.S. Appl. No. 15/187,452 dated Jan. 15, 2020, 2 pages.
United States Patent and Trademark Office, "Corrected Notice of Allowance," issued in connection with U.S. Appl. No. 15/187,452 dated Mar. 18, 2020, 2 pages.
United States Patent and Trademark Office, "Non-Final Office Action", issued in connection with U.S. Appl. No. 16/264,227 dated Jan. 31, 2019, 29 pages.
United States Patent and Trademark Office, "Final Office Action", issued in connection with U.S. Appl. No. 16/264,227 dated Apr. 29, 2020, 13 pages.

* cited by examiner

METHODS AND APPARATUS FOR SOFTWARE LIFECYCLE MANAGEMENT OF A VIRTUAL COMPUTING ENVIRONMENT

RELATED APPLICATIONS

This patent claims priority to Indian Provisional Patent Application Serial No. 3344/CHE/2015, which is titled "METHODS AND APPARATUS FOR LIFE CYCLE MANAGEMENT FOR RACK DEPLOYMENTS FOR VIRTUAL COMPUTING ENVIRONMENTS," and which was filed on Jun. 30, 2015. Indian Provisional Patent Application Serial No. 3344/CHE/2015 is incorporated herein by reference in its entirety.

FIELD OF THE DISCLOSURE

The present disclosure relates generally to virtual computing environments and, more particularly, to methods and apparatus for software lifecycle management of a virtual computing environment.

BACKGROUND

Virtualizing computer systems provides benefits such as the ability to execute multiple computer systems on a single hardware computer, replicating computer systems, moving computer systems among multiple hardware computers, and so forth. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Cloud computing is based on the deployment of many physical resources across a network, virtualizing the physical resources into virtual resources, and provisioning the virtual resources for use across cloud computing services and applications. When starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud computing services often lock a data center into a single source for hardware resources because of the need to use customized virtualization software specifically designed for a particular type of hardware. Examples disclosed herein enable establishing and maintaining data centers using virtualization software that is vendor-agnostic. In this manner, data center operators are provided with the flexibility of selecting from any of a number of hardware manufacturers to meet the physical hardware needs of data centers while making it relatively easy for the data center operators to initialize, virtualize and provision new resources. That is, data center operators may use examples disclosed herein to source hardware resources from any of a number of manufacturers without requiring the data center operators to undertake the burdens of developing new software to initialize, virtualize, and provision such resources.

Example methods and apparatus disclosed herein facilitate managing the software lifecycle for data center computing elements. For example, the methods and apparatus facilitate updating, patching, upgrading, etc. the multiple hardware elements that implement a computing element in a cluster of computing elements (e.g., a computing element may be a self-contained physical rack of multiple computing components (e.g., network switches, processors, storage, etc.) that may be joined with other self-contained physical racks to form a cloud or cluster of computing resources). In many computing environments it is undesirable to interrupt, interfere, etc. with the operation of the computing environment (e.g., the computing environment may operate 24 hours a day and may have no natural down time during which systems can be taken offline for maintenance). Example methods and apparatus facilitate scheduling and performing such updating, patching, upgrading, etc. by utilizing redundant and/or offline/spare computing resources to reduce and/or eliminate the impact on the operating comping environment.

Figure 1A:
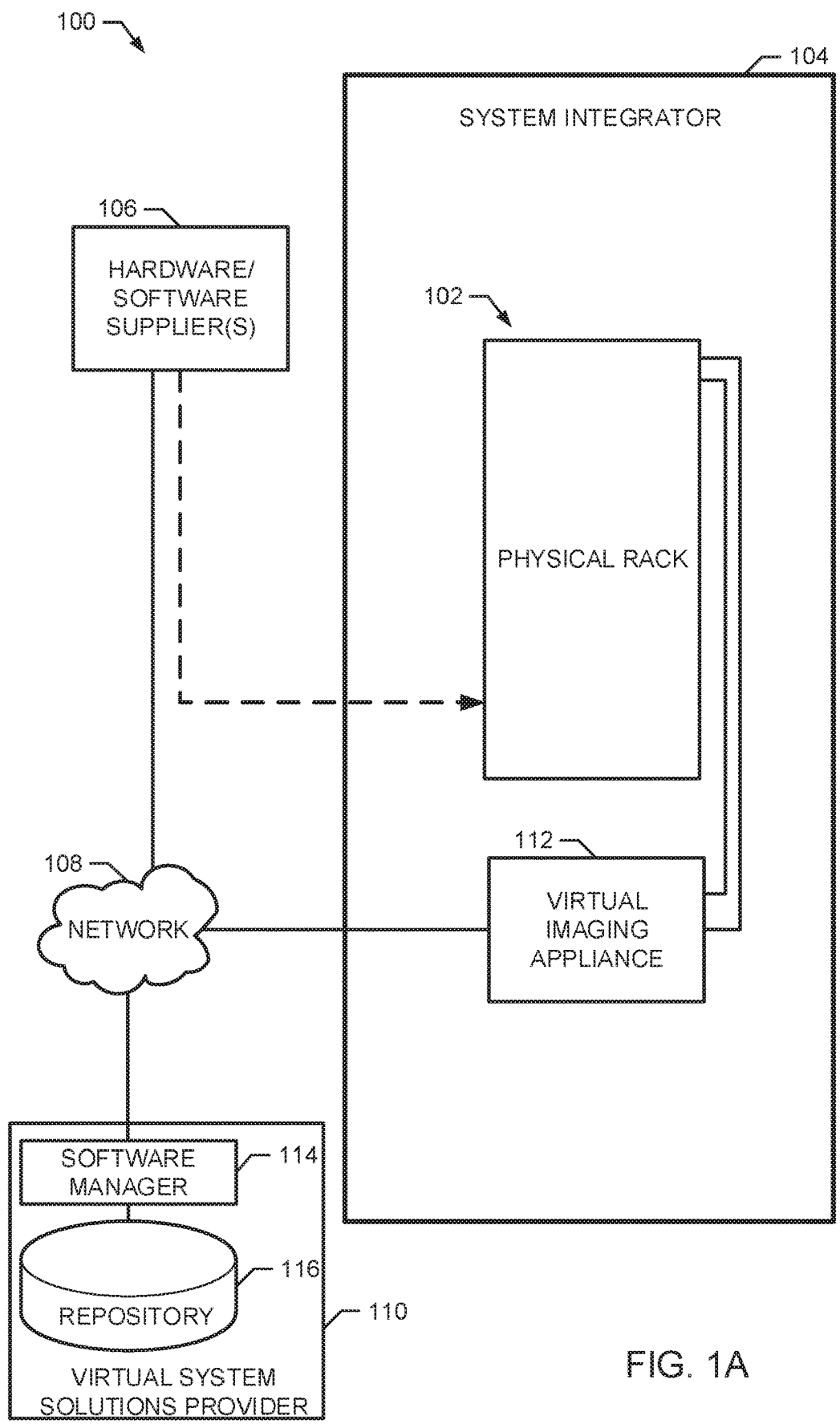
FIG. 1A is a block diagram of an example environment in which a physical rack is prepared by an example system integrator for distribution to a customer.
Figure 1B:
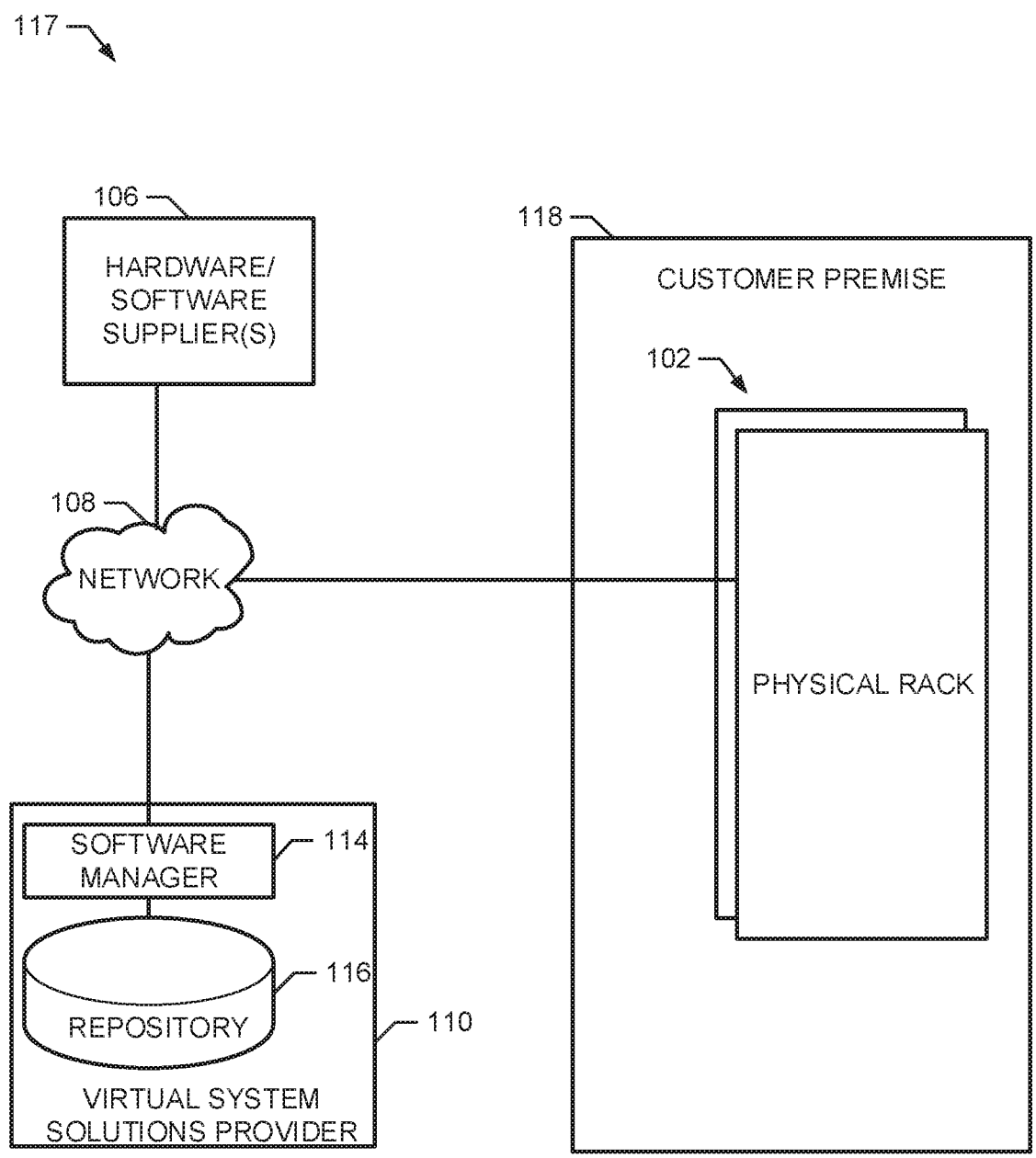
FIG. 1B is a block diagram of an example environment in which an example physical rack is deployed at an example customer premise.

FIG. 1A depicts an example environment 100 in which a physical rack 102 is prepared by an example system integrator 104 for distribution to a customer. FIG. 1B depicts an example environment 117 in which the example physical rack 102 is deployed at an example customer premise 118.

The example environment 100 of FIG. 1 includes the example physical rack 102, an example system integrator 104, an example hardware/software supplier(s) 106, an example network 108, an example virtual system solutions provider 110, and an example virtual imaging appliance 112.

The system integrator 104 of the illustrated example receives and fulfills customer orders for computing hardware. The system integrator 104 of the example of FIG. 1A obtains computer hardware and/or software from other suppliers, such as the example hardware/software supplier(s) 106, and assembles individual hardware components and/or software into functional computing units to fulfill customer orders. Alternatively, the system integrator 104 may design and/or build some or all of the hardware components and/or software to be used in assembling computing units. According to the illustrated example, the system integrator 104 prepares computing units for other entities (e.g., businesses and/or persons that do not own/employ and are not owned/employed by the system integrator 104). Alternatively, the system integrator 104 may assemble computing units for use by the same entity as the system integrator 104 (e.g., the system integrator 104 may be a department of a company, wherein the company orders and/or utilizes the assembled computing units). As used herein, the term customer refers to any person and/or entity that receives and/or operates the computing units supplied by the system integrator 104. In some examples, the system integrator 104 is an entity independent of equipment manufacturers such as white-label equipment manufacturers that provide hardware without branding. In other examples, the system integrator 104 is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

According to the illustrated example, one type of computing unit ordered from and/or assembled by the example system integrator 104 is the physical rack 102. The physical rack 102 is a combination of computing hardware and installed software that may be utilized by a customer to create and/or add to a virtual computing environment. For example, the physical rack 102 may include processing units (e.g., multiple blade servers), network switches to interconnect the processing units and to connect the physical rack 102 with other computing units (e.g., other ones of the physical rack 102 in a network environment such as a cloud computing environment), and/or data storage units (e.g., network attached storage, storage area network hardware, etc.). The physical rack 102 of the illustrated example is prepared by the system integrator 104 in a partially configured state to enable the computing devices to be rapidly deployed at a customer location (e.g., in less than 2 hours). For example, the system integrator 104 may install operating systems, drivers, operations software, management software, etc. The installed components may be configured with some system details (e.g., system details to facilitate intercommunication between the components of the physical rack 102) and/or may be prepared with software to collect further information from the customer when the virtual server rack is installed and first powered on by the customer.

To facilitate preparation of the physical rack 102 for distribution to a customer, the example system integrator 104 utilizes the virtual imaging appliance 112 to prepare and configure the operating systems, system configurations, software, etc. on the physical rack 102 prior to shipping the example server rack 102 to the customer. The virtual imaging appliance 112 of the illustrated example is a virtual computing appliance provided to the system integrator 104 by the example virtual system solutions provider 110 via the example network 108. The example virtual imaging appliance 112 is executed by the example system integrator 104 in a virtual computing environment of the system integrator 104. For example, the virtual imaging appliance 112 may be a virtual computing image, a virtual application, a container virtual machine image, a software application installed in an operating system of a computing unit of the system integrator 104, etc. The virtual imaging appliance 112 may alternatively be provided by any other entity and/or may be a physical computing device, may be multiple physical computing devices, and/or may be any combination of virtual and physical computing components.

The virtual imaging appliance 112 of the illustrated example retrieves software images and configuration data from the virtual systems solutions provider 110 via the network 108 for installation on the physical rack 102 during preparation of the physical rack 102. The virtual imaging appliance 112 of the illustrated example pushes (e.g., transmits, sends, etc.) the software images and configuration data to the components of the physical rack 102. For example, the virtual imaging appliance 112 of the illustrated example includes multiple network connections (e.g., virtual network connections, physical network connects, and/or any combination of virtual and network connections). For example, the virtual imaging appliance 112 of the illustrated examples connects to a management interface of a network switch(es) installed in the physical rack 102, installs network configuration information on the network switch(es), and reboots the switch(es) to load the installed configuration to communicatively couple the virtual imaging appliance 112 with the computing unit(s) communicatively coupled via the network switch(es). The example virtual imaging appliance 112 also connects to a management network interface (e.g., an out of band (OOB) interface) of a server(s) installed in the example physical rack 102 to cause an operating system(s) to be installed (e.g., utilizing a preboot execution environment (PXE) boot of an operating system installer). The example virtual imaging appliance 112 is also used to install virtual environment management components (described in further detail in conjunction with FIGS. 3-6 and in the following pages) and causes the virtual environment management components to boot so that they can take over the deployment of the example server rack 102.

The example virtual imaging appliance 112 is configured to perform many operations of the deployment without user intervention and without the need for a user of the example system integrator 104 to manually connect to the various interfaces of the components of the example physical rack 102. Furthermore, the user of the example virtual imaging appliance 112 is freed from the burden of locating the various software images that may be needed to configure the example physical rack 102 (e.g., firmware images for the network switch(es), operating system images for the server (s), operating system driver(s) for hardware components installed in the physical rack 102, etc.). Additionally, the virtual environment management components deployed by the example virtual imaging appliance 112 are configured by the virtual imaging appliance 112 to facilitate easy deployment of the physical rack 102 at the customer location. For example, the virtual management components installed on the physical rack 102 by the example virtual imaging appliance 112 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments).

The network 108 of the illustrated example communicatively couples the example system integrator 104 with the virtual system solutions provider 110 and communicatively couples the example hardware/software suppliers 106 with the example virtual system solutions provider 110. According to the illustrated example, the network 108 is the Internet. Alternatively, the network 108 may be any type of local network, wide area network, wireless network, wired network, any combination of networks, etc. While the network 108 of FIG. 1A is illustrated as a single network, the network may be any number and/or type of network. For example, the network 108 may be implemented by one or more of a local area network, a wide area network, a wireless network, a wired network, a virtual network, etc.

Referring to FIG. 1B, the example customer premise 118 is a location at which the example physical rack 102 (e.g., multiple ones of the physical rack 102 are deployed). For example, the customer premise 118 may be a data center, a location of a cloud provider, a business location, or any other location that wishes to implement a virtual computing environment comprised of one or more of the physical rack(s) 102. According to the illustrated example, the example customer premise 118 (and the example physical(s) rack 102 located at the example customer premise 118) is communicatively coupled to the example network 108 to communicatively couple the example customer premise 118 with the example virtual system solutions provider 110.

The virtual system solutions provider 110 of the illustrated example distributes (e.g., sells) and/or supports the example virtual imaging appliance 112. The virtual system solutions provider 110 of the illustrated example also provides a repository 116 of images and/or other types of software (e.g., virtual machine images, drivers, operating systems, etc.) that may be retrieved by A) the virtual imaging appliance 112 and installed on the physical rack 102 and/or B) retrieved by the example physical rack 102 after the example physical rack 102 is deployed at an example customer premise 118 (as illustrated in FIG. 1B). The virtual system solutions provider 110 may alternatively be implemented by multiple entities (e.g., from a manufacturer(s) of the software) and/or any other type of entity.

The example virtual system solutions provider 110 of the illustrated example of FIGS. 1A and 1B includes an example software manager 114 and the example repository 116. Together, the example software manager 114 and the example repository 116 provide software to A) the example virtual imaging appliance 112 of FIG. 1A for provisioning the example physical rack 102 at the example system integrator 104 and/or B) to the example physical rack(s) 102 of FIG. 1B at the example customer premise 118 for updating, upgrading, patching, etc. the computing resources included in the example physical rack(s) 102.

The example software manager 114 receives software from the example hardware/software supplier(s) 106 and stores the data in the example repository 116. The software may include new and/or updated drivers, operating systems, firmware, etc. for computing resources included in the example physical rack 102. For example, the software may include a firmware/operating system of a network switch installed in the physical rack 102, a hypervisor for execution on server hardware installed in the physical rack 102, a driver for a storage device installed in the physical rack 102, a security update for an operating system installed in the computing environment provided by the physical rack 102, etc.

The example software manager 114 receives requests for rack installation images from the example virtual imaging appliance 112, retrieves the requested image(s), and transfers the requested image(s) to the example virtual imaging appliance 112 via the network 108 to facilitate installation of the image(s) on the example physical rack 102 by the example virtual imaging appliance 112. The example software manager 114 may additionally provide updated image (s) to the example virtual imaging appliance 112 following the receipt of updated software from the example hardware/software supplier(s) 106. For example, the example virtual imaging appliance 112 may periodically send requests for updated image(s) and/or the example software manager 114 may notify the example virtual imaging appliance 112 when an updated image has been prepared (e.g., after new software has been received, tested, and added to a new image).

The example software manager 114 also receives requests for updated software from the example physical rack 102 after the example physical rack 102 has been deployed at the example customer premise 118. For example, when the example physical rack 102 is deployed as a part of a cluster of physical racks 102 at the example customer premise 118, one of the physical racks 102 may periodically send requests for updated software bundles (e.g., a group of software that includes software associated with the plurality of computing resources installed in the example physical rack 102). In response to such requests, the example software manager 114 retrieves a manifest file that includes a bundle version so that the physical rack 102 may determine if the bundle includes software that is newer, updated, improved, etc. relative to the software currently installed on the computing resources of the example physical rack 102. For example, if the manifest file identifies a version that is newer than a version of a bundle of software currently installed on the example physical rack 102, the bundle includes new software (e.g., a new firmware that has been selected for installation on a network switch installed in the example physical rack 102). In some instances, the virtual system solutions provider 110 may support multiple different physical rack implementations (e.g., different combinations of computing resources and/or software installed in the example physical rack 102). In such instances, the manifest file may additionally include an identifier of the particular combination of components in the example physical rack 102. For example, the manifest file may identify a stock-keeping unit (SKU) associated with the example physical racks 102 to allow the physical rack 102 to confirm that a received manifest file identifies software for the particular physical rack 102.

Figure 3:
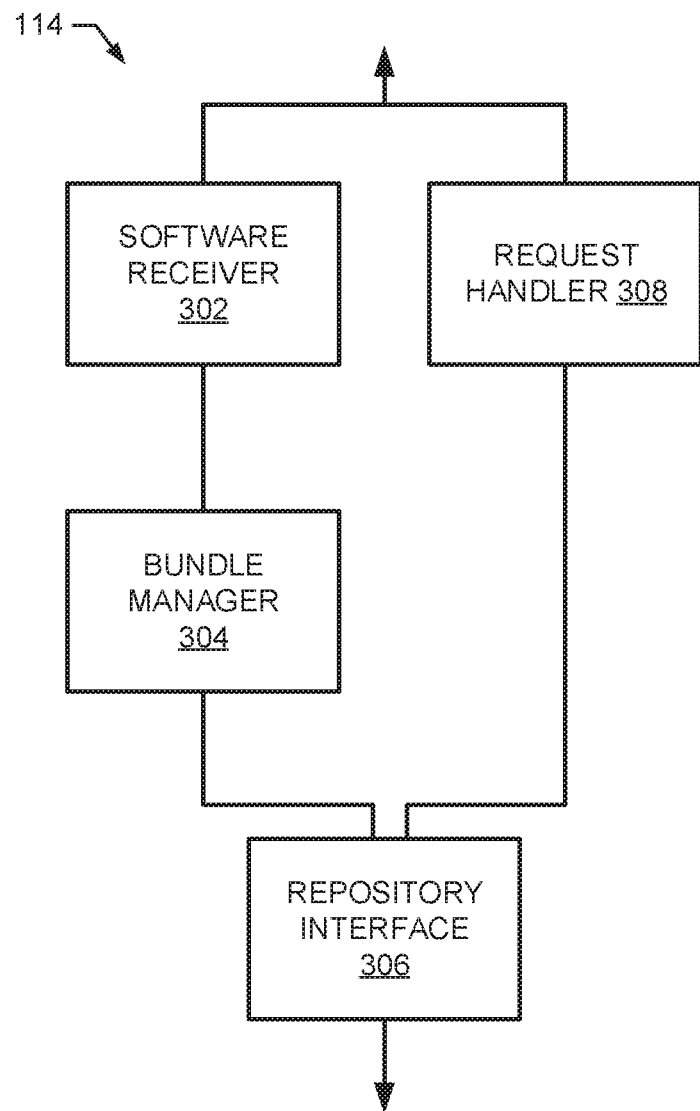
FIG. 3 is a block diagram of an example implementation of the software manager of FIG. 1A and/or FIG. 1B.

An example implementation of the example software manager 114 is described in conjunction with FIG. 3.

The example repository 116 stores software received from the example hardware/software supplier(s) 106 and manifest files generated by the example software manager 114 for the example software. The repository 116 of the illustrated example is communicatively coupled with the example software manager 114 to allow the example software manager 114 to store and retrieve software. The example repository 116 is a database. Alternatively, the example repository may be any other type of storage such as, for example, a network attached storage, a hard drive, a shared network drive, a file, a folder, etc.

Figure 2:
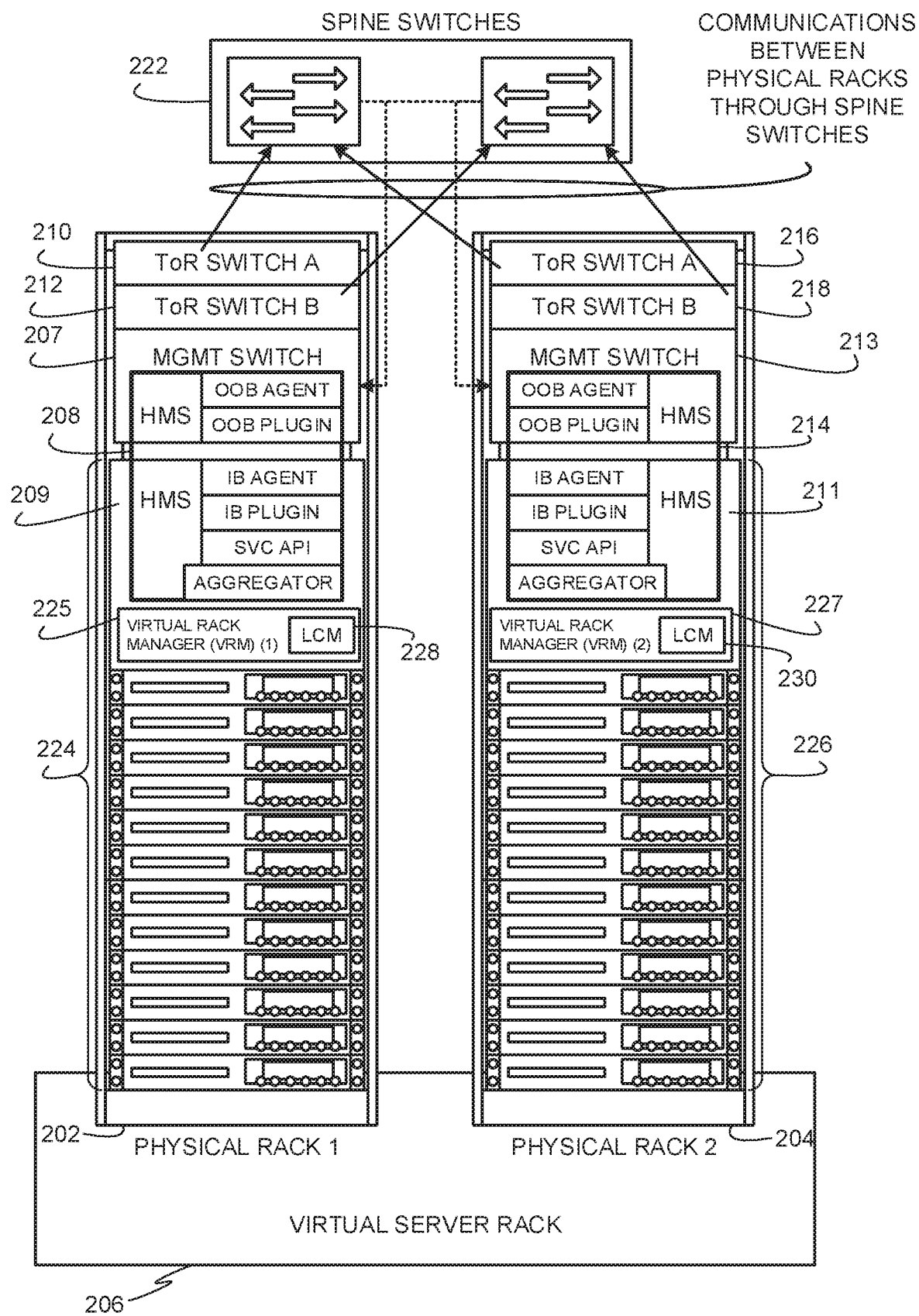
FIG. 2 depicts example physical racks in an example virtual server rack deployment.

FIG. 2 depicts example physical racks 202, 204 in an example deployment of a virtual server rack 206. For example, the physical racks 202, 204 may be ones of the physical rack 102 assembled by the example system integrator 104 of FIG. 1A. In the illustrated example, the first physical rack 202 has an example top-of-rack (ToR) switch A 210, an example ToR switch B 212, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node(0) 211. In the illustrated example, the management switch 213 and the server host node (0) 211 run an HMS 214 for the second physical rack 204.

In the illustrated example, the management switches 207, 213 of the corresponding physical racks 202, 204 run corresponding out-of-band (OOB) agents and OOB plugins of the corresponding HMSs 208, 214. Also in the illustrated example, the server host nodes(0) 209, 211 of the corresponding physical racks 202, 204 run corresponding IB agents, IB plugins, HMS service APIs, and aggregators.

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 202, 204 for downlink communications and to the spine switch(es) (e.g., using 40 Gbps links) for uplink communications. In the illustrated example, the management switch 207, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 208, 214 is provided with IB connectivity to individual server nodes (e.g., server nodes in example physical hardware resources 224, 226) of the physical rack 202, 204. In the illustrated example, the IB connection interfaces to physical hardware resources 224, 226 via an operating system running on the server nodes using an OS-specific API such as vSphere API, command line interface (CLI), and/or interfaces such as Common Information Model from Distributed Management Task Force (DMTF).

The HMSs 208, 214 of the corresponding physical racks 202, 204 interface with virtual rack managers (VRMs) 225, 227 of the corresponding physical racks 202, 204 to instantiate and manage the virtual server rack 206 using physical hardware resources 224, 226 (e.g., processors, network interface cards, servers, switches, storage devices, peripherals, power supplies, etc.) of the physical racks 202, 204. In the illustrated example, the VRM 225 of the first physical rack 202 runs on three server host nodes of the first physical rack 202, one of which is the server host node(0) 209. As used herein, the term "host" refers to a functionally indivisible unit of the physical hardware resources 224, 226, such as a physical server that is configured or allocated, as a whole, to a virtual rack and/or workload; powered on or off in its entirety; or may otherwise be considered a complete functional unit. Also in the illustrated example, the VRM 227 of the second physical rack 204 runs on three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 210, 212, 216, 218 of the physical racks 202, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

In examples disclosed herein, a command line interface (CLI) and APIs are used to manage the ToR switches 210, 212, 216, 218. For example, the HMS 208, 214 uses CLI/APIs to populate switch objects corresponding to the ToR switches 210, 212, 216, 218. On HMS bootup, the HMS 208, 214 populates initial switch objects with statically available information. In addition, the HMS 208, 214 uses a periodic polling mechanism as part of an HMS switch management application thread to collect statistical and health data from the TOR switches 210, 212, 216, 218 (e.g., Link states, Packet Stats, Availability, etc.). There is also a configuration buffer as part of the switch object which stores the configuration information to be applied on the switch.

The example VRM 225, 227 of the illustrated example of FIG. 2 includes an example lifecycle manager (LCM) 228, 230. The example LCM 228, 230 is responsible for requesting software from the example virtual system solutions provider 110 and managing the installation of the example software. When a manifest file identifying information about a software bundle is received from the example virtual system solutions provider 110, the example LCM 228, 230 determines if the manifest applies to the example physical rack 202, 204, verifies the presence of dependencies required for installation of the software components of the software bundle (or resolves such dependencies), ensures that there are sufficient computing resources for installation of the software components of the software bundle, schedules the software components for installation, and performs the installation of the software components.

Figure 4:
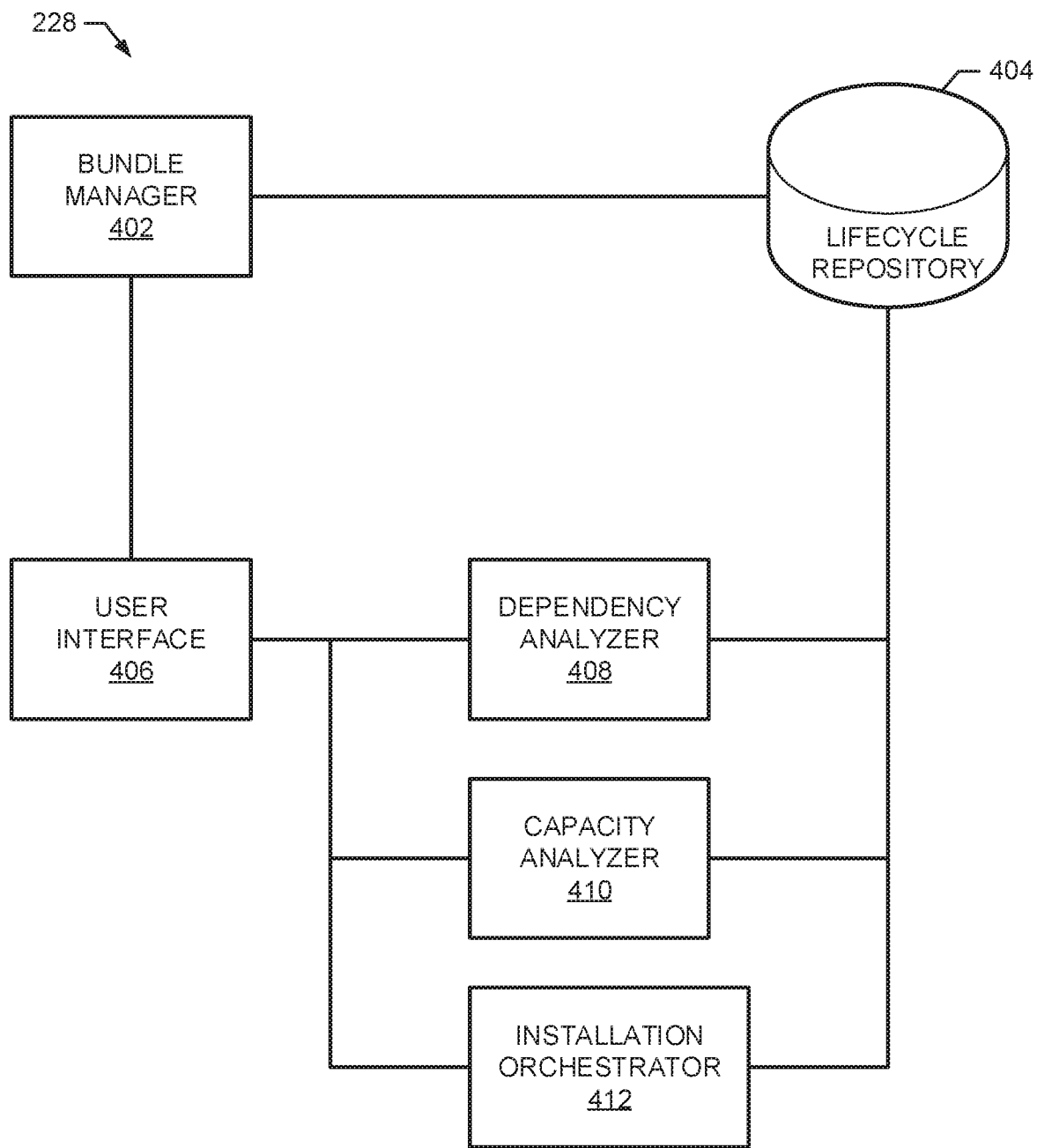
FIG. 4 is a block diagram of an example implementation of the example lifecycle manager of FIG. 2.

An example implementation of the LCM 228, 230 is illustrated in FIG. 4. For simplicity, the remainder of this description will refer to the example LCM 228. However, the description and example implementations included therein may also apply to the example LCM 230.

FIG. 3 is a block diagram of an example implementation of the software manager 114 of FIG. 1A and/or 1B. The example software manager 114 of FIG. 3 includes an example software receiver 302, an example bundle manager 304, and example repository interface 306, and an example request handler 308.

The example software receiver 302 of the illustrated example receives software components (e.g., drivers, firmware, operating systems, applications, etc.) from the example hardware/software suppliers 106 and transfers the software components to the example bundle manager 304. For example, the software receiver 302 may receive notifications from the example hardware/software supplier(s) 106 when new software is available and/or may periodically query the example hardware/software supplier(s) 106 for the availability of new software.

The example bundle manager 304 receives software from the example software receiver 302, coordinates testing of the software, and, after testing, adds the software to the example repository 116. When adding the software to the example repository 116, the example bundle manager 304 adds a reference to the software to a manifest file that is associated with a software bundle (e.g., a collection of software for a particular physical rack version/implementation) to which the software is added. For example, the bundle manager 304 may add a new entry to the manifest file for the software and/or may replace a previous version of the software identified in the manifest file with the new version of the software. Testing of the software may be accomplished by an administrator installing the software on a test physical rack and verifying that the software installs as expected and does not interfere with the operation of the test physical rack (e.g., does not cause errors, does not conflict with our software or hardware, etc.). During the testing of the software, the example bundle manager 304 collects dependency information (e.g., information about what software components may be required for installation of the software). The example bundle manager 304 stores the dependency information in a manifest file associated with the software bundle to which the software is added. For example, the example bundle manager 304 may receive user input identifying software dependencies, may receive an input file identifying software dependencies, may monitor the software installation to programmatically determine software dependencies, etc.

The example repository interface 306 interfaces with the example repository 116. For example, the repository interface 306 may be a database interface of the example software manager 114. Alternatively, the repository interface 306 may be any other type of interface the facilitate the example bundle manager 304 and/or the example request handler 308 storing and/or retrieved manifest files and/or software from the example repository 116.

The example request handler 308 receives requests for software images and/or updated software bundles from the example virtual imaging appliance 112 of FIG. 1A and/or the example physical rack 102 at the example customer premise 118 of FIG. 1B. In response to the requests, the example request handler 308 retrieves the requested information. For example, the request handler 308 may retrieve a manifest file and transmit the manifest file to the source of the request (e.g., the example virtual imaging appliance 112 and/or the example physical rack 102) to allow the source of the request to determine if the manifest file identifies software associated with the physical rack 102 on which the software is to be installed. For example, the manifest file may identify a SKU that is checked against a SKU associated with the physical rack 102. When the source of the request indicates that the manifest file identifies the desired software, the request handler 308 may retrieve the software (e.g., a software image, software bundle, etc.) from the example repository 116 and transmit the software to the source of the request.

Figure 5:
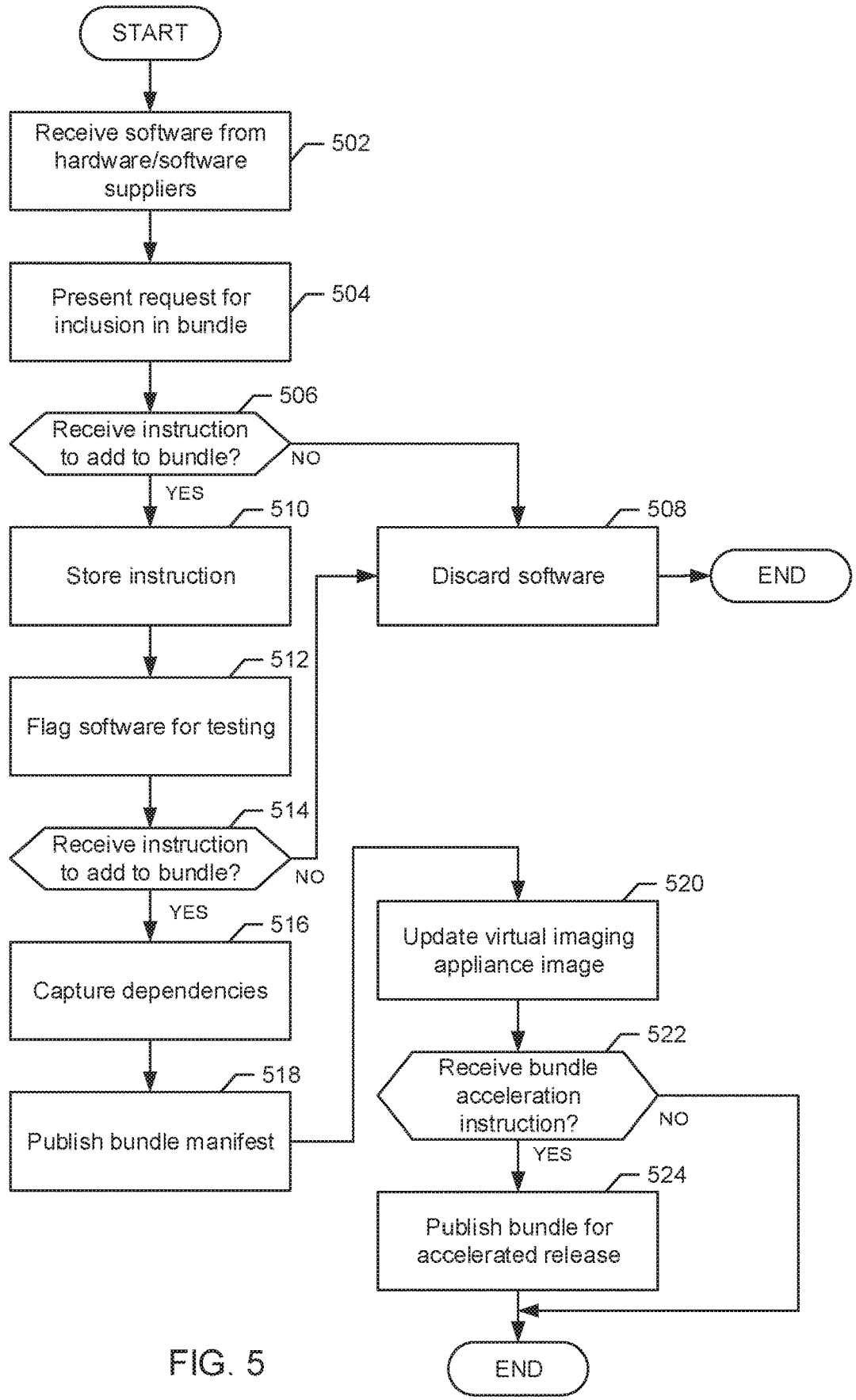
FIG. 5 is a flowchart representative of example machine readable instructions that may be executed to implement the example software manager of FIG. 1A, FIG. 1B, and/or FIG. 3.

A flowchart illustrating example instructions for implementing the example software manager 114 of FIGS. 1A, 1B, and/or 3 is described in conjunction with FIG. 5.

While an example manner of implementing the software manager 114 of FIGS. 1A and/or 1B is illustrated in FIG. 3, one or more of the elements, processes and/or devices illustrated in FIG. 3 may be combined, divided, re-arranged, omitted, eliminated and/or implemented in any other way. Further, the example software receiver 302, the example bundle manager 304, the example repository interface 306, the example request handler 308 and/or, more generally, the example software manager 114 of FIG. 3 may be implemented by hardware, software, firmware and/or any combination of hardware, software and/or firmware. Thus, for example, any of the example software receiver 302, the example bundle manager 304, the example repository interface 306, the example request handler 308 and/or, more generally, the example software manager 114 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example software receiver 302, the example bundle manager 304, the example repository interface 306, the example request handler 308 and/or, more generally, the example software manager 114 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example software manager 114 of FIGS. 1A and/or 1B may include one or more elements, processes and/or devices in addition to, or instead of, those illustrated in FIG. 3, and/or may include more than one of any or all of the illustrated elements, processes and devices.

FIG. 4 is a block diagram of example implementation of the LCM 228 in the example VRM 225 of the example physical rack 202 of FIG. 2 (e.g., the physical rack 102 deployed at the example customer premise 118). The example LCM 228 includes an example bundle manager 402, an example lifecycle repository 404, an example user interface 406, an example dependency analyzer 408, an example capacity analyzer 410, and an example installation orchestrator 412.

The example bundle manager 402 interfaces with the example software manager 114 of the example virtual system solutions provider 110 of FIG. 1B to receive manifest files and software to be deployed at the example physical rack 202 and/or other ones of the physical rack 202 deployed in a cluster). The example bundler manager 402 periodically polls the example software manager 114 to determine if there is an updated manifest file to be analyzed for applicability to the example physical rack 202. Alternatively, the bundle manager 402 may receive notifications when a new manifest file is available (e.g., if the bundle manager 402 has registered with the virtual system solutions provider 110 to receive such notifications). When a new manifest is received by the bundle manager 402 the bundle manager 402 determines if the manifest is applicable to the physical rack and, if so, the example bundle manager 402 notifies the example user interface 406 that a new manifest has been received. If the example user interface 406 notifies the bundle manager 402 that an administrator has approved/scheduled a download of the software bundle, the example bundle manager 402 retrieves the software identified by the example manifest file and stores the software in the example lifecycle repository along with the manifest file.

The lifecycle repository 404 of the illustrated example stores manifest files and software received from the example virtual systems solution provider 110 via the example bundle manager 402. The example lifecycle repository 404 is a software database. Alternatively, the lifecycle repository 404 may be implemented by any type of file and/or data storage such as, for example, a network attached storage, a hard drive, a shared network drive, a file, a folder, etc.

The example user interface 406 of FIG. 4 provides notifications to administrators of the physical rack 202 and receives instructions from the administrators. For example, when the example bundle manager 402 notifies the example user interface 406 that a new manifest/software bundle has been received, the example user interface 406 presents a notification to the administrator and requests the administrator's input as to whether the administrators would like to download the software bundle and/or schedule installation of the software bundle. When the example user interface 406 receives an instruction from an administrator to download software bundle, the example user interface 406 notifies the example bundle manager 406. When the example user interface 406 receives an instruction from an administrator to schedule installation of the software bundle, the example user interface 406 notifies the example dependency analyzer 408, the example capacity analyzer 410, and/or the example installation orchestrator 412. The example user interface 406 additionally presents any error notifications generated by the example dependency analyzer 408, the example capacity analyzer 410, and/or the example installation orchestrator 412.

The dependency analyzer 408 of the illustrated example receives a notification from the example user interface 406 that an administrator has requested installation of a software bundle. In response to the notification, the example dependency analyzer 408 determines the dependency requirements of the software bundle by analyzing the manifest files, checks the dependency requirements against the current state of the hardware and software components installed on the physical rack 202, and notifies the installation orchestrator 412 of an order of software installation desired and/or required by the dependency requirements of the software bundle. For example, the dependency analyzer 408 may determine that version 3.0 of a driver requires that version 2.0 be currently installed and, after determining that version 1.0 is currently installed, will add version 2.0 to the installation schedule. In another example, a manifest file may indicate that a web server update requires a database update that is also identified in the manifest file. The example dependency analyzer 408 will, in such an instance, notify the example installation orchestrator 412 that the database update, in this example, should be scheduled prior to the web server update.

The capacity analyzer 410 of the illustrated example receives a notification from the example user interface 406 that an administrator has requested installation of a software bundle. In response to the notification, the example capacity analyzer 410 retrieves the manifest file for the software bundle from the example lifecycle repository 404. The example capacity analyzer 410 determines the hardware and/or software computing resources of the example physical rack 202 (and other physical racks 202 that may be clustered) that will be affected by the installation of the software bundle. For example, the capacity analyzer 410 determines which hardware and/or software components will need to be restarted in order to perform the installation of the software bundle. The capacity analyzer 410 compares the computing resource impact to the available computing resources of the example physical rack 202 (and cluster of physical racks 202) and the operating requirements of the example physical rack 202 (e.g., service level agreements indicating the required computing resource availability and/or redundancy). The example capacity analyzer 410 determines if there are sufficient computing resources to perform the software installation without interfering with the operating requirements. The example capacity analyzer 410 determines the available computing resources by determining the affected computing resources (e.g., determining a workload domain that has been scheduled for an update) and queries an application program interface (API) associated with an operating environment (e.g., queries a VMware vCenter® server). For example, the capacity analyzer 410 may determine that there are two ToR switches 210, 212 installed in the example physical rack 202 and, accordingly, when the software installation requires a switch reboot to update the switch, one of the ToR switches 210, 212 can be rebooted at a time without affecting performance of the physical rack 202. Alternatively, the capacity analyzer 410 may determine that all processing resources allocated to a particular workload domain (or any other type of computing resource cluster) are in use (e.g., a workload is currently executing on all computing resources such that no computing resources can be temporarily deactivated for updating). In such an instance, the example capacity analyzer 410 will allocate (or attempt to allocate) an additional computing resource(s) (e.g., add another server to the workload domain) so that the executing workload can be temporarily migrated from the computing resources in the workload domain (e.g., one at a time) onto the additional computing resource(s) while the computing resources are updated. For example, after the workload is migrated from one of the computing resources, the computing resource may be moved to a maintenance mode, updated, rebooted, and returned to operating mode. Thus, in addition to analyzing the capacity for installation of the software bundle, the example capacity analyzer 410 facilitates the addition of capacity when needed. The capacity analyzer 410 communicates information about the capacity arrangements to the example installation orchestrator 412 for use when scheduling the installation (e.g., to notify the installation orchestrator 412 of the availability of the additional computing resources that may be utilized during the installation).

The example installation orchestrator 412 receives information collected by the example dependency analyzer 408 and the example capacity analyzer 410 and schedules the installation of the software of the software bundle identified in the received manifest. The example installation orchestrator 412 schedules (or attempts to schedule) the installation of the software to meet the dependency requirements and to avoid interruption of the operation of the physical rack 202 (and/or multiple physical racks 202). According to the illustrated example, the installation orchestrator 412 schedules devices for independent unavailability (e.g., schedules unavailability of redundant devices so that at least one of the redundant devices is available at all times). Furthermore, the example installation orchestrator 412 schedules the temporary movement/migration of virtual machines during the installation.

Figure 6:
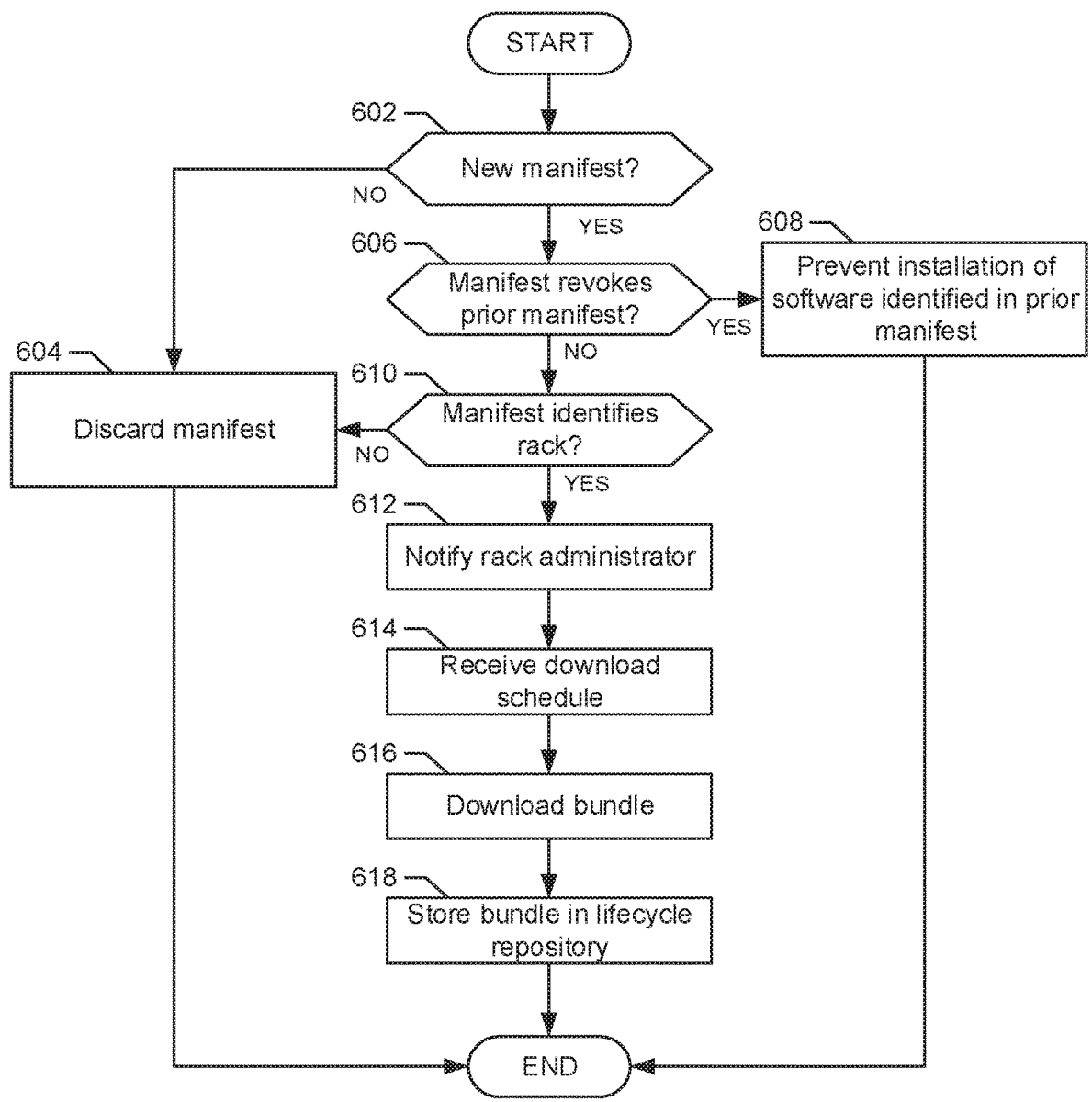
FIGS. 6-8 are flowcharts representative of machine readable instructions that may be executed to implement the example lifecycle manager of FIG. 2 and/or FIG. 4.
Figure 7:
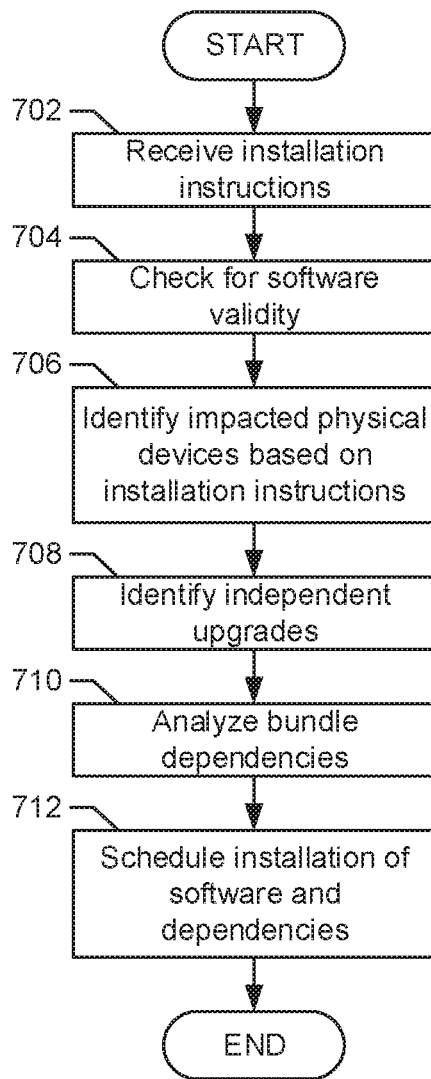
Figure 8:
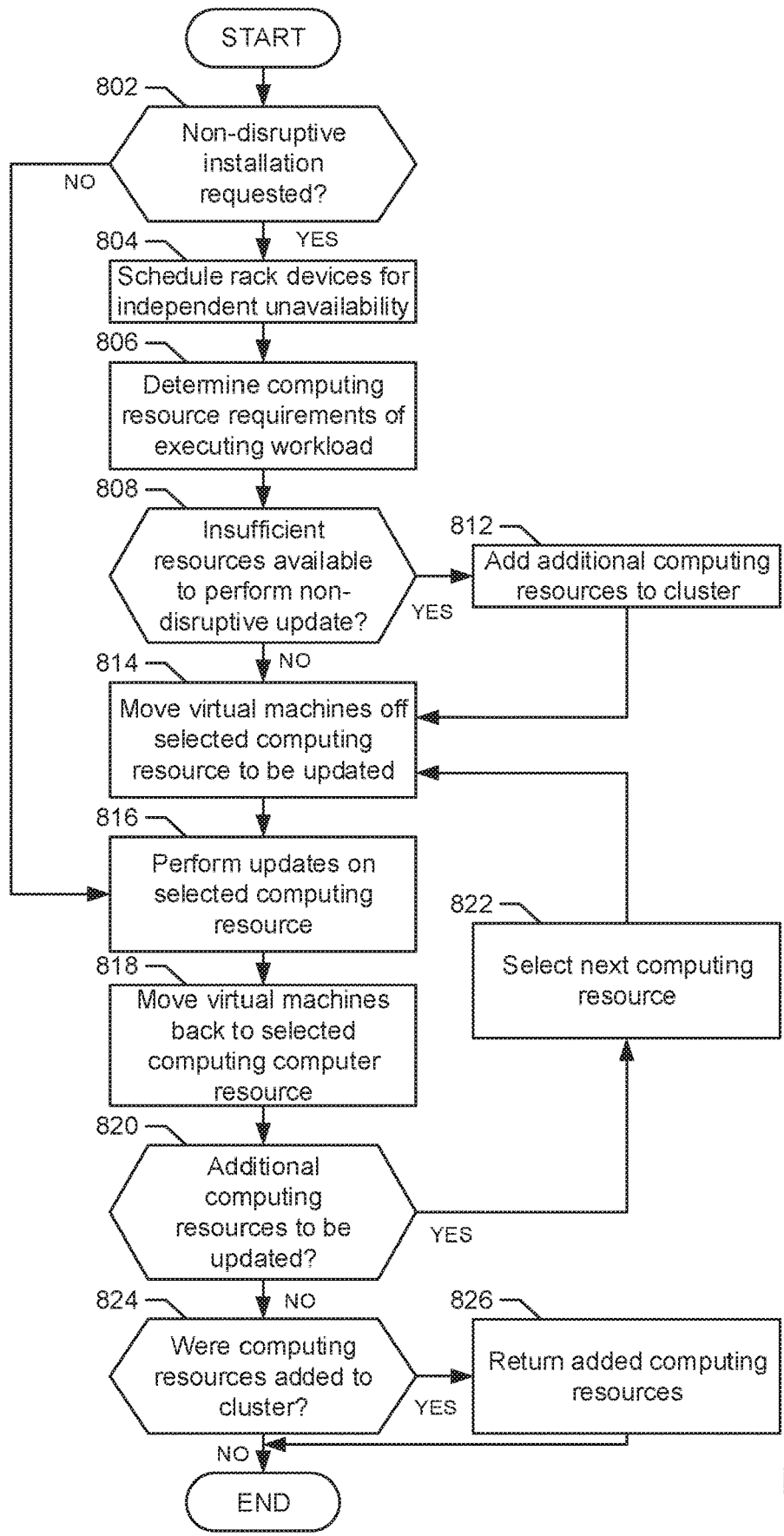

Flowcharts illustrating example instructions for implementing the example LCM 228 of FIGS. 2 and/or 4 are described in conjunction with FIGS. 6-8.

While an example manner of implementing the LCM 228 (and/or the example LCM 230) of FIG. 2 is illustrated in FIG. 4, one or more of the elements, processes and/or devices illustrated in FIG. 4 may be combined, divided, re-arranged, omitted, eliminated and/or implemented in any other way. Further, the example bundle manager 402, the example lifecycle repository 404, the example user interface 406, the example dependency analyzer 408, the example capacity analyzer 410, the example installation orchestrator 412 and/or, more generally, the example LCM 228 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example bundle manager 402, the example lifecycle repository 404, the example user interface 406, the example dependency analyzer 408, the example capacity analyzer 410, the example installation orchestrator 412 and/or, more generally, the example LCM 228 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example LCM 228 of FIG. 2 may include one or more elements, processes and/or devices in addition to, or instead of, those illustrated in FIG. 4, and/or may include more than one of any or all of the illustrated elements, processes and devices.

A flowchart representative of example machine readable instructions for implementing the example software manager 114 of FIGS. 1A, 1B, and/or 3 is shown in FIG. 5. In this example, the machine readable instructions comprise a program for execution by a processor such as the processor 912 shown in the example processor platform 900 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 5, many other methods of implementing the example software manager 114 may alternatively be used. For example, the order of execution of the blocks may be changed, and/or some of the blocks described may be changed, eliminated, or combined.

As mentioned above, the example process of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 5 begins when the example software receiver 302 of the example software manager 114 receives software from a hardware/software supplier (block 502). For example, the software may include applications, drivers, operating systems, configuration files, etc. The software may be received in a notification from the hardware/software supplier, may be received in response to a polling of the software supplier by the example software receiver 302, etc.

The example software receiver 302 then presents a request to include the new software in an appropriate bundle (block 504). For example, the software receiver 302 may add an item to a task list requesting approval to add the software to the bundle, may present a notification on a graphical user interface, etc. The example software receiver 302 determines if an instruction to add the software to the bundle has been received (block 506). When an instruction to not add the software to the bundle has been received, the example software receiver 302 discards the received software (block 508).

When an instruction to add the software to the bundle has been received (block 506), the example bundle manager 304 stores the software for the bundle (e.g., stores the software in the example repository 116) (block 510). The example bundle manager then flags the software for testing (block 512). For example, an administrator may install the software on the example physical rack 102 and/or in the example virtual server rack 206 to verify that the software operates as intended, does not interfere with other operations, etc. The example bundle manager 304 then determines if an instruction to continue adding the software to the bundle has been received following the testing (block 514). When an instruction to not add the software to the bundle has been received (e.g., because the testing of the software identified problems), the example bundle manager 304 discards the software (block 508).

When the example bundle manager 304 receives an instruction to continue adding the software to the bundle (block 514), the example bundle manager 304 captures dependencies of the example software (block 516). The dependencies may be captured by tracing the testing of the software to track dependencies accessed during the testing, by receiving a dependency record (e.g., a file) identifying required dependencies for the software, by receiving user input identifying dependencies, etc. According to the illustrated example, the dependencies are captured by recording the dependencies in a manifest file to be distributed with a bundle including the software. Alternatively, the dependencies may be captured in any other manner (e.g., stored in a database that is accessed to build a manifest).

The example repository interface 306 publishes the manifest file that is generated with the dependency information (block 518). According to the illustrated example, the repository interface 306 stores the manifest (e.g., and the software identified in the manifest) in the example repository 116 of FIG. 1 to enable the request handler 308 to service requests. For example, the manifest may be identified as the most current manifest (e.g., replacing a previously most-current manifest) such that software requests received by the example request handler 308 are serviced by transmitting the most-current manifest and/or software.

According to the illustrated example, when the software bundle associated with a virtual server rack is updated, the example request handler 308 updates a virtual server rack image utilized by the example virtual imaging appliance 112 of FIG. 1 to ensure that the virtual imagine appliance 112 will utilized the latest software when deploying a virtual server rack (block 520).

The request handler 308 of the illustrated example determines if a bundle acceleration instruction was received (block 522). A bundle acceleration instruction indicates that a software bundle should be deployed to virtual server racks more rapidly than the next scheduled software release. For example, distribution of a bundle may be accelerated when the existing software bundle includes a vulnerability that is patched by the most-current software bundle. The bundle acceleration instruction may be received from a user, may be identified in an attribute of the software received by the example software receiver 302, etc.

When the example request handler 308 determines that a bundle acceleration instruction was not received (block 522), the program of FIG. 5 terminates. When the example request handler 308 determines that a bundle acceleration instruction was received, the example request handler 308 and/or the example repository interface 306 publish the bundle for accelerated release (block 524). According to the illustrated example, the example request handler 308 notifies the example repository interface 306 to store an indication (e.g., a flag) in the example repository 116 that the bundle is slated for accelerated release. Accordingly, when the example request handler 308 receives a request from a virtual server rack (e.g., a software update request), the example request handler 308 will detect the flag and notify the requesting virtual server rack that an accelerated bundle is available (e.g., to suggest that the virtual server rack should deploy the bundle even if it is not time for a scheduled release). The program of FIG. 5 then terminates.

Flowcharts representative of example machine readable instructions for implementing the example lifecycle manager 228 of FIG. 2 and/or FIG. 4 are shown in FIGS. 6-8. In these examples, the machine readable instructions comprise a program(s) for execution by a processor such as the processor 1012 shown in the example processor platform 1000 discussed below in connection with FIGS. 6-8. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 6-8, many other methods of implementing the example lifecycle manager 228 may alternatively be used. For example, the order of execution of the blocks may be changed, and/or some of the blocks described may be changed, eliminated, or combined.

As mentioned above, the example process of FIGS. 6-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIGS. 6-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

The process of FIG. 6 begins when the example bundle manager 402 determines if received manifest is new (block 602). The example bundle manager 402 may receive a bundle in request to transmitting a request for a new bundle to the example request handler 308 of the example software manager 112, may receive a manifest from a notification transmitted by the example request handler 308 to the example bundle manager 402, etc. The example bundle manager 402 may determine if the manifest is new (e.g., not previously processed), but analyzing information stored in the lifecycle manager (e.g., analyzing a list of processed bundles, analyzing a version number to determine if the version number identified in the newly received manifest is greater than the version number of the most recently installed bundle, etc.). When the example bundle manager 402 determines that the manifest is not new, the bundle manager 402 discards the manifest (block 604).

When the example bundle manager 402 determines that the manifest is new (block 602), the example bundle manager 402 determines if the manifest revokes a previously received manifest (block 606). For example, rather than identifying new and/or updated software, the manifest may indicate that a previously received manifest has been revoked and should be prevented from install and/or software identified in the revoked manifest should be uninstalled (block 608).

When the example bundle manager 402 determines that the manifest does not revoke a prior manifest (block 606), the example bundle manager 402 compares the identifying information for the virtual server rack 206 to identifying information included in the manifest to determine if the manifest identifies the virtual server rack 206 (block 610). For example, different iterations of virtual server racks that utilized different software may be distributed. When the manifest is not matched to the virtual server rack 206, the example bundle manager 402 discards the example manifest (block 606).

When the example bundle manager 402 determines that the manifest is matched to the example virtual server rack 206 (block 610), the example user interface 406 notifies the administrator of the virtual server rack 206 that a new manifest has been received (block 612). For example, the example user interface 406 may transmit an electronic message to the administrator, may set notification, may add a task to a task list, etc. The example user interface 406 receives a download schedule from the administrator (block 614). Alternatively, the download schedule may be automatically determined by analyzing the system to determine a time at which system resources are available to download the software identified the manifest and/or the download may be automatically started prior to, in parallel with, and/or after the administrator is notified of the new manifest. Utilizing the schedule (or automatically), the example bundle manager 402 downloads the software components identified in the manifest (block 616). The software components may be downloaded from the example software manager 114, from a software distributor, from a hardware manufacturer (e.g., a manufacturer may distribute hardware drivers), etc. The example bundle manager 402 stores the software bundle in the example lifecycle repository 404 (block 618). The process of FIG. 6 then terminates.

FIG. 7 is a flowchart illustrating example machine readable instructions that may be executed to implement the example lifecycle manager 228 to schedule installation of downloaded software (e.g., software downloaded by the process illustrated by FIG. 6). The example process of FIG. 7 begins when the example user interface 406 receives an instruction to install a bundle of software that was previously downloaded to the example lifecycle repository 404 (block 702). The example installation orchestrator 412 checks the downloaded software for validity (block 704). The validity checks may include verifying a signature, fingerprint, checksum, hash, etc. against a known valid value (e.g., a known value published the example software manager 114, published by a distributor of the software, etc.). Additionally or alternatively, the software may be scanned for viruses, malware, malicious actions, etc. Additionally or alternatively, the software may be checked for compatibility with the example virtual server rack 206 by analyzing software operating on and configurations installed on the example virtual server rack 206 (e.g., in instances where an administrator of the example virtual server rack 206 has customized the example virtual server rack 206 outside the stock configuration implemented by the example virtual imagine appliance 112.

The example installation orchestrator 412 then determines physical devices that will be impacted based on the installation instructions (block 706). A bundle may include software for one or more of the physical devices included in the physical racks 202, 204 of the example virtual server rack 206. For example, a bundle may include software to upgrade a firmware of the ToR Switch A, B 210, 212, 216, 216, 218. In such an example, the example installation orchestrator 412 determines that installation of the software on the ToR Switch A, B 210, 212, 216, 216, 218 will require a reboot of each of these switches.

The example dependency analyzer 408 additionally determines which of the software installations in the bundle may be performed independently (block 708). Software installations may be performed independently when they are not dependent on another software installation or process that is part of the installation. The example dependency analyzer 408 also analyzes the software in the bundle to determine which of the software installations are dependent on other software installations or operations (block 710). For example, the dependency analyzer 408 may analyze dependency information included in the software bundle manifest file generated by the example software manager 114. According to the illustrated example, the dependency analyzer 408 represents the information from blocks 708 and 710 in an ordered list of software with dependencies identified in the ordered list.

The example installation orchestrator 412 analyzes the information collected in blocks 706-710 to generate an installation schedule to cause the software to be installed in the example virtual server rack 206 (block 712). According to the illustrated example, the installation orchestrator 412 schedules the installation of non-dependent installations in parallel when those installations do not impact the same physical devices. The installation orchestrator 412 additionally schedules the installation of software components to ensure that required dependencies are installed prior to installation of software which requires the dependency. The example installation orchestrator 412 performs the installation of the software according to the generated schedule. Alternatively, the example installation orchestrator 412 may schedule other components to perform the installation (e.g., schedule the software installation with an installation agent of the physical device on which the software is to be installed).

FIG. 8 is a flowchart illustrating example machine readable instructions that may be executed to implement the example lifecycle manager 228 to install downloaded software (e.g., software installation scheduled by the example process illustrated in FIG. 7). The example process of FIG. 8 begins when the example installation orchestrator 412 determines if a requested software installation includes a request for a non-disruptive installation (block 802). For example, the example user interface 406 may receive a user request to perform a non-disruptive installation (e.g., an installation that reduces or eliminates an impact on users of the virtual server rack 206 by minimizing the complete unavailability of resources). For example, the impact on users can be eliminated by making less than all redundant resources unavailable at any given time (e.g., by updating and rebooting on ToR Switch A, B 210, 212, 216, 218 at a time). While non-disruptive installation reduces the impact on users, the installation process may take longer and, thus, may not be desired by an administrator in all instances (e.g., when a software patch is needed to address a vulnerability or problem with the virtual server rack 206). When a non-disruptive shutdown is not requested (block 802), control proceeds to block 816.

When a non-disruptive shutdown is requested (block 802), the example installation orchestrator 412 attempts to schedule physical devices for independent unavailability (e.g., to make less than all redundant devices unavailable at any given time). The example capacity analyzer 410 then determines computing resource requirements for executing the workload(s) assigned to the example virtual server rack 206 (block 806). According to the illustrated example, the capacity analyzer 410 determines the workload(s) requirements by analyzing a service level agreement(s) associated with the workload(s). Additionally or alternatively, the capacity analyzer 410 may perform a live analysis of the workload(s) requirements (e.g., by monitoring active, peak, average, etc. resource utilization (e.g., processor utilization, memory utilization, storage utilization, etc.)). The example capacity analyzer 410 then determines if the installation schedule will reduce the available computing resources such that the computing requirements of the workload(s) cannot be met (block 808). The example capacity analyzer 410 considers the computing resource requirements as well as the required service level agreement requirements such as required computing resource redundancy (e.g., a requirement that all processing resources include a redundant processing resource).

When there are not sufficient computing resources to perform the installation according to the schedule and to meet the computing resource requirements of the workload(s) (block 808), the example installation orchestrator 412 adds additional computing resources to a cluster for the workload(s) (block 812). For example, if a cluster is associated with 8 physical computing resources 224 and all 8 physical computing resources 224 are needed to meet the requirements of the workload(s) executing on the cluster, it is not possible to perform updates of the physical computing resources 224 even if only one computing resource would be taken offline at a time. Accordingly, the installation orchestrator 412 temporarily adds another computing resource (e.g., another physical computing resource 224). The computing resources to be added to the cluster may come from a pool of unused, idle, standby, etc. computing resources, may come from another cluster that includes more computing resources than are needed to meet the requirements of the workload(s) executing in the cluster, etc.

After determining that there are sufficient computing resources (block 808) or adding additional computing resources (block 812), the example installation orchestrator moves virtual computing elements off of computing resources to be updated (block 814). The virtual computing elements may be moved to execute on another computing resource available in the cluster (e.g., processing resources, storage resources, network resources, etc.) and/or another computing resource that has been added to the cluster.

After moving virtual machine resources (block 814) or determining that non-disruptive shutdown is not requested (block 802), the example installation orchestrator 412 installs the software bundle on a currently selected computing resource (block 816). According to the illustrated example, the installation includes any needed reboots in order to prepare the software for execution.

After the computing resource is updated, if virtual computing resources were moved off of the updated physical computing resource in block 814, the example installation orchestrator 412 moves the virtual computing resources back to the updated physical computing resources (block 818).

The example installation orchestrator 412 determines if there are additional physical computing resources to be updated (block 820). When there are additional computing resources to be updated, the example installation orchestrator 412 selects the next physical computing resource (block 822) and control returns to block 814 (if non-disruptive shutdown was requested) or block 816 (if non-disruptive shutdown was not requested).

When there are no further computing resources to be updated (block 824), the example installation orchestrator 412 determines if computing resources were added to the computing cluster (e.g., if block 812 was performed) (block 824). When there were no additional computing resources added to the cluster, the process of FIG. 8 terminates. When there were additional computing resources added to the cluster, the example installation orchestrator 412 returns the added computing resources to their previous state (block 826) and the process of FIG. 8 terminates. For example, the installation orchestrator 412 may move the computing resources back to an idle state, a standby state, another cluster that included excess computing resources, etc.

Figure 9:
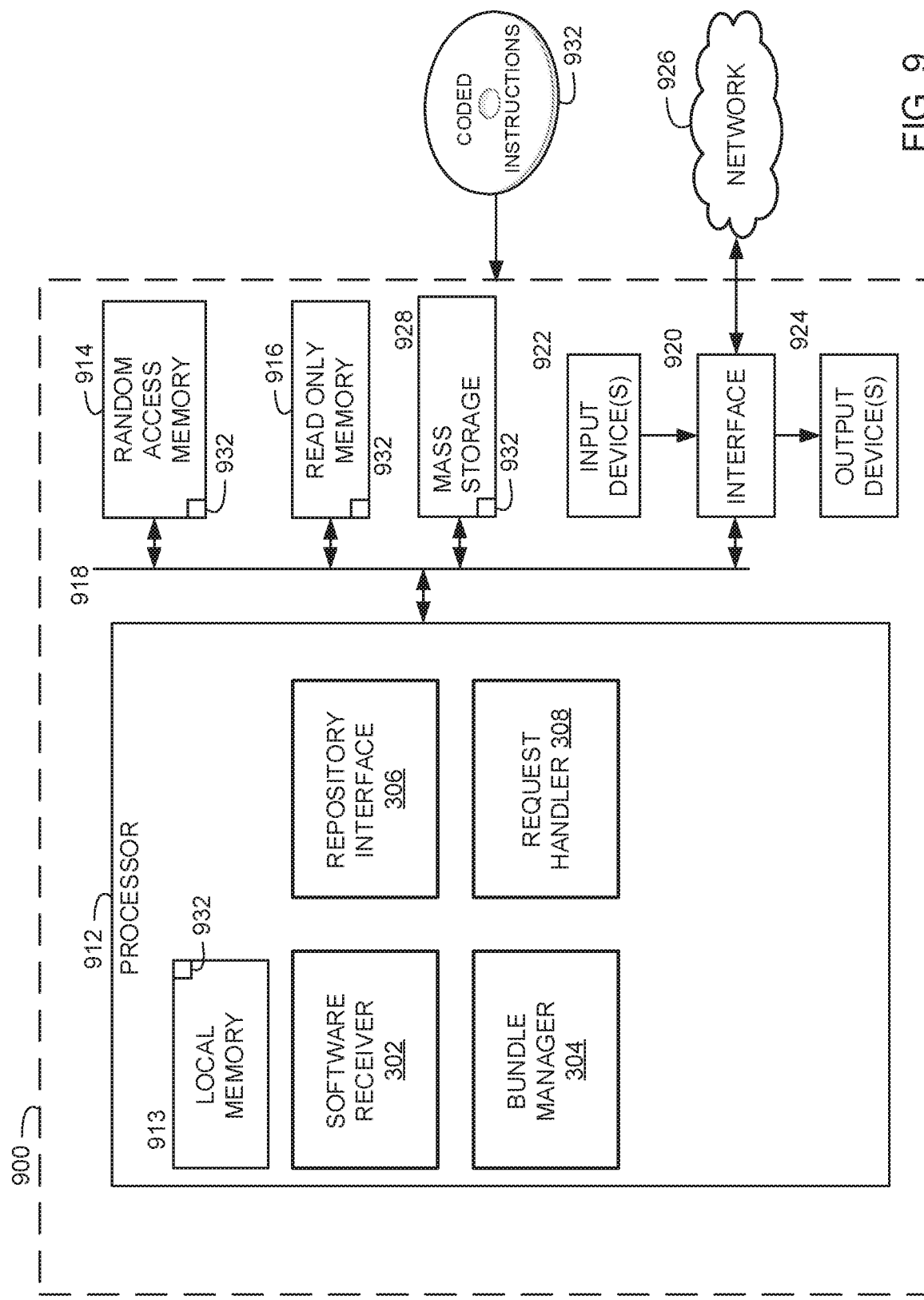
FIG. 9 is a block diagram of an example processing platform capable of executing the example machine-readable instructions of FIG. 5 to implement the example software manager of FIG. 1A, FIG. 1B, and/or FIG. 3.

FIG. 9 is a block diagram of an example processor platform 900 capable of executing the instructions of FIG. 5 to implement the software manager 114 of FIG. 1A, FIG. 1B, and/or FIG. 3. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The example processor 912 includes the example software receiver 302, the example bundle manager 304, the example repository interface 306, and the example request handler 308.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 5 may be stored in the mass storage device 928, in the volatile memory 914, in the non-volatile memory 916, and/or on a removable tangible computer readable storage medium such as a CD or DVD.

Figure 10:
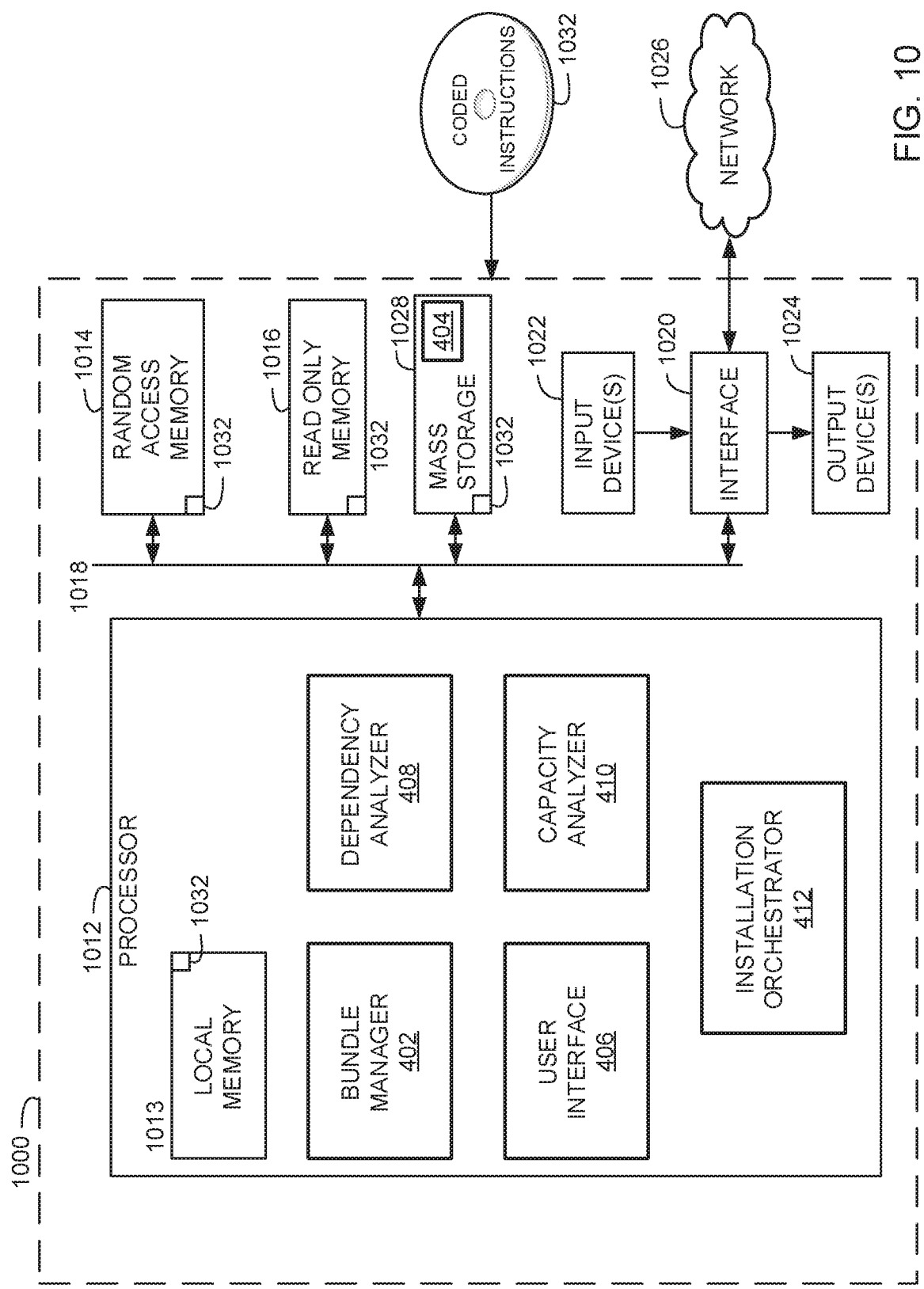
FIG. 10 is a block diagram of an example processing platform capable of executing the example machine-readable instructions of FIGS. 6-8 to implement the example lifecycle manager of FIG. 2 and/or FIG. 4.

FIG. 10 is a block diagram of an example processor platform 1000 capable of executing the instructions of FIGS. 6-8 to implement the lifecycle manager 228 of FIG. 2 and/or FIG. 4. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The example processor 1012 includes the example bundle manager 402, the example user interface 406, the example dependency analyzer 408, the example capacity analyzer 410, and the example installation orchestrator 412.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 6-8 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture facilitate updating software, firmware, patches, drivers, etc. of computing resources included in a virtual server rack architecture. In some examples, software updates are deployed to the variety of physical computing resources included in a virtual server rack while minimizing the impact on the operation of those computing resources. In some examples, a lifecycle manager manages the software installation process to schedule software updates of the heterogeneous computing environment to ensure that dependencies and software execution requirements are satisfied.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to update software of a virtual server rack system, the method comprising:
   determining that an installation of software updates will cause a first computing resource in the virtual server rack system to be temporarily offline, wherein computing resources assigned to a workload include the first computing resource;
   prior to the installation of the software updates, determining, by initiating a query of an application programming interface, if the computing resources assigned to the workload in a virtual environment in the virtual server rack system will be sufficient to meet a service level agreement while the first computing resource is temporarily offline during the installation of the software updates;

when the query indicates that each of the computing resources assigned to the workload in the virtual environment in the virtual server rack is in use such that the installation of the software updates will cause the computing resources to violate the service level agreement associated with the workload while the first computing resource is temporarily offline during the installation of the software updates, identifying a second computing resource that is available for use during the installation of the software updates;

adding the second computing resource to the virtual environment;

migrating the workload to the second computing resource;

installing the software updates on the first computing resource;

when the software updates have been installed on the first computing resource, migrating the workload to the first computing resource; and returning the second computing resource to a standby state not assigned to any workload.

2. The method as defined in claim 1, wherein the computing resources assigned to the workload in the virtual environment in the virtual server rack system include processing units.

3. The method as defined in claim 2, wherein adding the second computing resource includes adding an unallocated processing unit to the workload.

4. The method as defined in claim 1, further including, after completion of the installation of the software updates, migrating the workload to the first computing resource.

5. The method as defined in claim 1, further including determining if non-disruptive installation is requested.

6. The method as defined in claim 5, wherein determining if sufficient computing resources for installing the software updates are available in the virtual environment in the virtual server rack system is performed in response to determining that the non-disruptive installation is requested.

7. The method as defined in claim 5, further including, in response to determining that the non-disruptive installation is requested, scheduling installation on the first computing resource to be completed before installation begins on the second computing resource that is a same type as the first computing resource.

8. A tangible computer readable storage medium comprising instructions that, when executed, cause a machine to at least:

determine that an installation of software updates will cause a first computing resource in a virtual server rack system to be temporarily offline, wherein computing resources assigned to a workload include the first computing resource;

prior to the installation of the software updates, determine, by initiating a query of an application programming interface, if the computing resources assigned to the workload in a virtual environment in the virtual server rack system will be sufficient to meet a service level agreement while the first computing resource is temporarily offline during the installation of the software updates;

when the query indicates that each of the computing resources assigned to the workload in the virtual environment in the virtual server rack is in use such that the installation of the software updates will cause the computing resources to violate the service level agreement associated with the workload while the first computing resource is temporarily offline during the installation of the software updates, identify a second computing resource that is available for use during installation of the software updates;

add the second computing resource to the virtual environment;

migrate the workload to the second computing resource;

install the software updates on the first computing resource;

when the software updates have been installed on the first computing resource, migrate the workload to the first computing resource; and return the second computing resource to a standby state not assigned to any workload.

9. The tangible computer readable storage medium as defined in claim 8, wherein the computing resources assigned to the workload in the virtual environment in the virtual server rack system include processing units.

10. The tangible computer readable storage medium as defined in claim 9, wherein the instructions, when executed, cause the machine to add the second computing resource by adding an unallocated processing unit to the workload.

11. The tangible computer readable storage medium as defined in claim 8, wherein the instructions, when executed, cause the machine to, after completion of the installation of the software updates, migrate the workload to the first computing resource.

12. The tangible computer readable storage medium as defined in claim 8, wherein the instructions, when executed, cause the machine to determine if non-disruptive installation is requested.

13. The tangible computer readable storage medium as defined in claim 12, wherein the instructions, when executed, cause the machine to determine if sufficient computing resources for installing the software updates are available in the virtual environment in the virtual server rack system is performed in response to determining that the non-disruptive installation is requested.

14. The tangible computer readable storage medium as defined in claim 8, wherein the instructions, when executed, cause the machine to, in response to determining that non-disruptive installation is requested, schedule installation on the first computing resource to be completed before installation begins on the second computing resource that is a same type as the first computing resource.

15. An apparatus comprising:
means for analyzing capacity to:
determine that an installation of software updates will cause a first computing resource in a virtual server rack system to be temporarily offline, wherein computing resources assigned to a workload include the first computing resource;

prior to the installation of the software updates, determine, by initiating a query of an application programming interface, if the computing resources assigned to the workload in a virtual environment in the virtual server rack system will be sufficient to meet a service level agreement while the first computing resource is temporarily offline during the installation of the software updates;

when the query indicates that each of the computing resources assigned to the workload in the virtual environment in the virtual server rack is in use such that the installation of the software updates will cause the computing resources to violate the service level agreement associated with the workload while the first computing resource is temporarily offline during the installation of the software updates, identify a second computing resource that is available for use during installation of the software updates; and means for installation orchestration to:
- add the second computing resource to the virtual environment;
- migrate the workload to the second computing resource;
- install the software updates on the first computing resource;
- when the software updates have been installed on the first computing resource, migrating the workload to the first computing resource; and
- returning the second computing resource to a standby state not assigned to any workload.

16. The apparatus as defined in claim 15, wherein the computing resources assigned to the workload in the virtual environment in the virtual server rack system include processing units.

17. The apparatus as defined in claim 16, wherein the means for installation orchestration is further to add the second computing resource by adding an unallocated processing unit to the workload.

18. The apparatus as defined in claim 15, wherein the means for installation orchestration is to, after completion of the installation of the software updates, migrate the workload to the first computing resource.

19. The apparatus as defined in claim 15, wherein the means for installation orchestration is further to determine if non-disruptive installation is requested.

20. The apparatus as defined in claim 19, wherein the means for analyzing capacity is to determine if sufficient computing resources for installing the software updates are available in the virtual environment in the virtual server rack system in response to determining that the non-disruptive installation is requested.

21. The apparatus as defined in claim 19, wherein the means for installation orchestration is to, in response to determining that the non-disruptive installation is requested, schedule installation on the first computing resource to be completed before installation begins on the second computing resource that is a same type as the first computing resource.

* * * * *